(12) United States Patent
Prowell

(10) Patent No.: US 7,219,049 B2
(45) Date of Patent: May 15, 2007

(54) PERFORMING HIERARCHICAL ANALYSIS OF MARKOV CHAIN USAGE MODELS

(76) Inventor: Stacy Jackson Prowell, 6005 Warrenpark La., Knoxville, TN (US) 37912

( * ) Notice: Subject to any disclaimer, the term of this patent is extended or adjusted under 35 U.S.C. 154(b) by 554 days.

(21) Appl. No.: 10/663,482

(22) Filed: Sep. 15, 2003

(65) Prior Publication Data
US 2005/0060357 A1   Mar. 17, 2005

(51) Int. Cl.
*G06F 9/45* (2006.01)
(52) U.S. Cl. .............................. 703/22; 703/2; 717/124
(58) Field of Classification Search .................. 703/22, 703/2; 717/124; 704/256; 714/25
See application file for complete search history.

(56) References Cited

U.S. PATENT DOCUMENTS

| 5,500,941 | A | 3/1996 | Gil .............................. 395/183 |
| 5,630,051 | A | 5/1997 | Sun et al. .................... 395/183 |
| 5,703,885 | A | 12/1997 | Sun et al. ...................... 371/27 |
| 6,289,502 | B1 | 9/2001 | Garland et al. ................. 717/2 |
| 6,324,496 | B1 | 11/2001 | Alur et al. ..................... 703/17 |
| 2003/0014734 | A1 | 1/2003 | Hartmann et al. .......... 717/125 |
| 2003/0014735 | A1 | 1/2003 | Achlioptas et al. ......... 717/125 |
| 2003/0028856 | A1 | 2/2003 | Apuzzo et al. ............. 717/124 |

OTHER PUBLICATIONS

"Cleanroom Software Engineering Fundamentals" Prowell, et al.; 1999; pp. 3-59.

*Primary Examiner*—Albert W. Paladini
(74) *Attorney, Agent, or Firm*—Thomas, Kayden, Horstemeyer & Risley LLP

(57) ABSTRACT

Hierarchical analysis of Markov chain usage models is provided. In some embodiments elements of an expanded matrix are calculated as a function of parent elements and child elements, rather than by direct inversion techniques. The expanded matrix is a first moment matrix of a flattened model. In hierarchical models, the flattened model represents a child model instantiated within a parent model. The child elements are elements of a child matrix, which is a first moment matrix of the child model. The parent elements are elements of a parent matrix, which is a first moment matrix of the parent model.

20 Claims, 18 Drawing Sheets

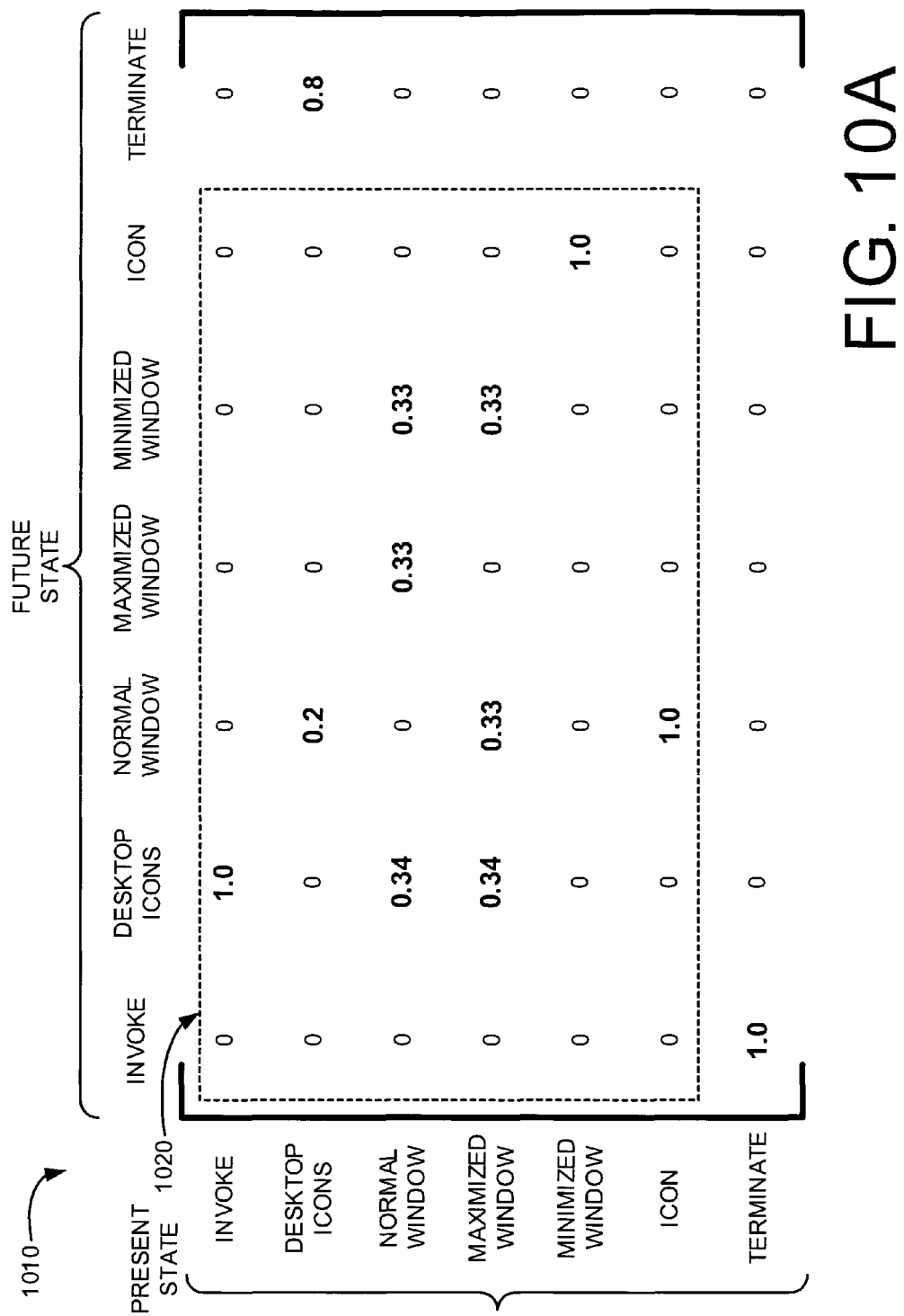

PERFORMING HIERARCHICAL ANALYSIS OF MARKOV CHAIN USAGE MODELS

FIELD OF DISCLOSURE

The present disclosure relates generally to modeling and, more particularly, to modeling using Markov chain usage models.

BACKGROUND

Markov chain usage models have proven to be valuable tools in software testing as well as in modeling software-engineering processes. As is known in the art, the Markov chain usage model may be represented as a square matrix where each element represents a probability of transition from a present state, which is represented along the row of the matrix, to a future state, which is represented along the column of the matrix. In other words, given a present state i and a future state j, the matrix element $p_{ij}$ provides the probability of transition from i to j. Since all events from any one state must either remain in that state or move to another state, the sum of the probabilities in each row is exactly 1.0.

As is known, submodels may be substituted for states within a Markov chain usage model similar to how program modules may be substituted for certain lines of computer code in modular programming. Markov chain usage models, in which submodels are nested, are often referred to as "hierarchical models" due to the resulting hierarchical structure from the nested submodels. Thus, if a submodel appears as a node in the Markov chain usage model, then the transient submatrix of a Markov chain usage model may be represented as $M=[m_{ij}]$, and the transient submatrix of a submodel of M may be represented as $S=[s_{ij}]$. Typically, an analysis of a hierarchical model involves flattening of the model by instantiating S in M, thereby generating a flattened model F. The transient submatrix of the flattened model may be represented as $F=[f_{ij}]$.

Each of the transient sub-matrices M, S, and F has a corresponding first moment matrix $N^M$, $N^S$, and $N^F$, respectively, where:

$$N^M = (I-M)^{-1} \qquad [\text{Eq. 1}],$$

$$N^S = (I-S)^{-1} \qquad [\text{Eq. 2}],$$

and $$N^F = (I-F)^{-1} \qquad [\text{Eq. 3}],$$

with I being the identity matrix.

Traditionally, the first row and diagonal of $N^F$ are determined by actually constructing the flattened model and ascertaining the desired values from the flattened model by direct inversion of (I−F). Hence, if |M|=a and |S|=b, then |F|≈a+b. Due to the often-complex nature of the first moment matrices, the complexity of obtaining $N^F$ using traditional approaches is approximately $O((a+b)^3)$ while the space required to store the results is $O((a+b)^2)$. In view of this complexity, there exists a need in the art for a more efficient approach to calculating the first row and diagonal elements of $N^F$.

SUMMARY

The present disclosure provides systems and methods for performing hierarchical analysis in Markov chain usage models.

In some embodiments, among others that are disclosed herein, elements of an expanded matrix are calculated as a function of parent elements and child elements, rather than by direct inversion techniques. In hierarchical models, the expanded matrix is a first moment matrix of a flattened model, which represents a child model instantiated within a parent model. The child elements are elements of a child matrix, which is a first moment matrix of the child model. The parent elements are elements of a parent matrix, which is a first moment matrix of the parent model.

Other devices, systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 10A is a diagram showing a transition matrix representing the flattened model of FIG. 7.

DETAILED DESCRIPTION OF THE EMBODIMENTS

The embodiments will now be described with reference to the drawings. While several embodiments are described in connection with these drawings, there is no intent to limit the invention to the embodiment or embodiments disclosed herein. On the contrary, the intent is to cover all alternatives, modifications, and equivalents.

The several embodiments described herein provide for streamlined calculations of elements in a first moment matrix for hierarchical models without flattening the hierarchical models. Unlike traditional approaches, which flattened a model to instantiate all submodels within the model, performing the calculations without flattening the model substantially reduces the complexity of calculations and, also, reduces the storage requirements. Various embodiments, which are presented below, provide greater details and describe several advantages that may be realized by the invention.

Figure 1:
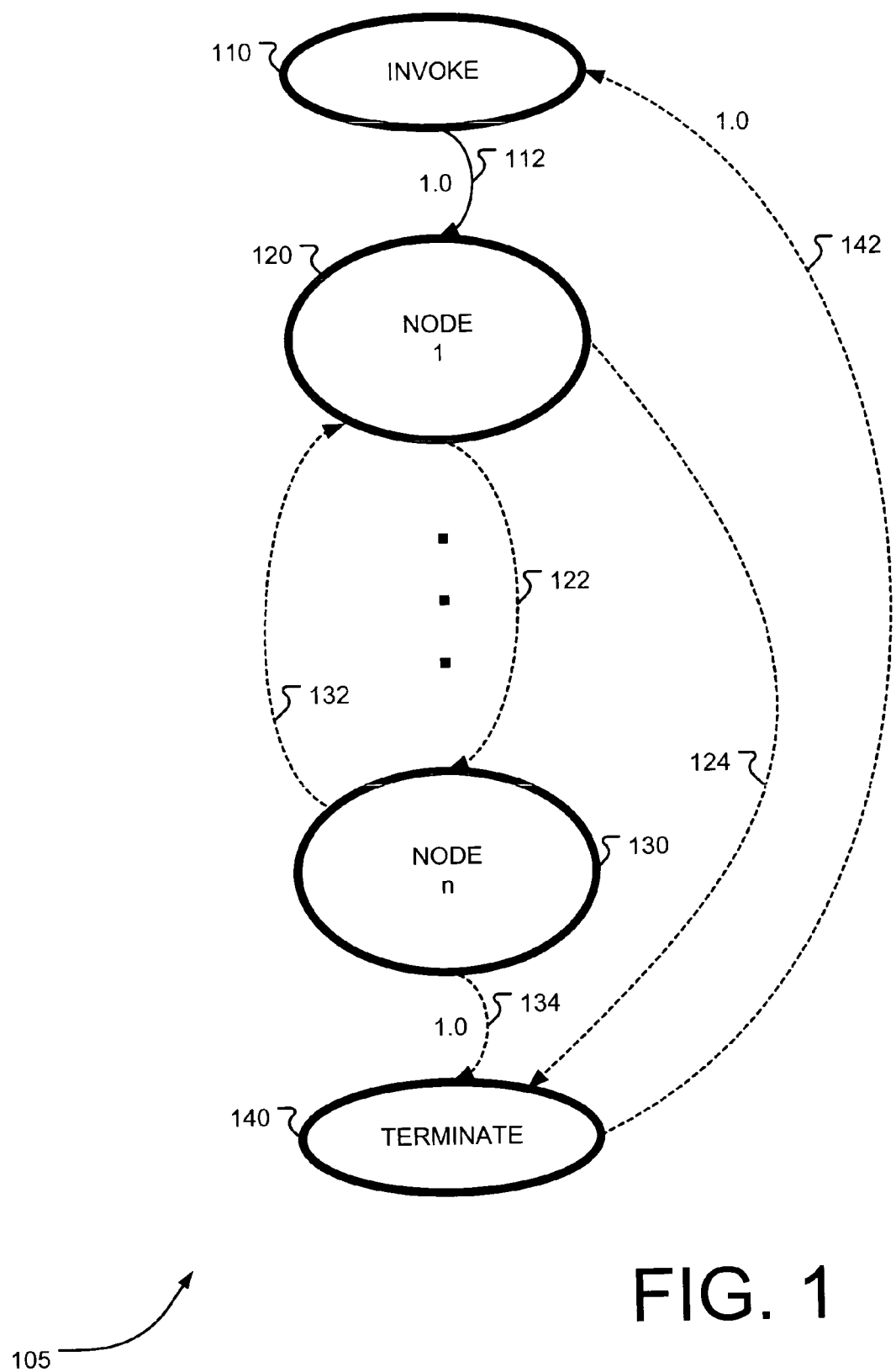
FIG. 1 is a diagram showing a generic Markov chain usage model having nodes and transition paths between the nodes.

FIG. 1 is a diagram showing a generic Markov chain usage model 105 having nodes 110, 120, 130, 140 and transition paths 112, 122, 124, 132,134, 142 between the nodes 110, 120, 130, 140. Conventionally, a Markov chain usage model 105 defines a process that begins at a source, which is represented in FIG. 1 as an "invoke" node 110, and ends at a sink, which is represented in FIG. 1 as a "terminate" node 140. Often, between the invoke node 110 and the terminate node 140, the process includes various states, which are represented in FIG. 1 as "node 1" 120 through "node n" 130. The various states (or nodes) 120, 130 are connected to each other, either directly or indirectly, via pathways 112, 122, 124, 132, 134, 142 that determine the flow of the process. Hence, the existence of a pathway between two nodes (e.g., node 1 and node n) indicates that a process may transition from one of the two nodes (e.g., node 1) to the other of the two nodes (e.g., node n). While FIG. 1 shows a recursive process in which the terminate node 140 transitions back to the invoke node 110, it should be appreciated that, in practice, Markov chain usage models have a single absorbing terminate node 140, in which the process (or use) ends. In other words, the terminate node is an absorbing node from which no further transitions occur. In some Markov chain usage models, a single node (e.g., "node 1" 120) may represent a subprocess that further includes subnodes and subpathways of its own. One embodiment of a generic subprocess is shown in FIG. 2.

Figure 2:
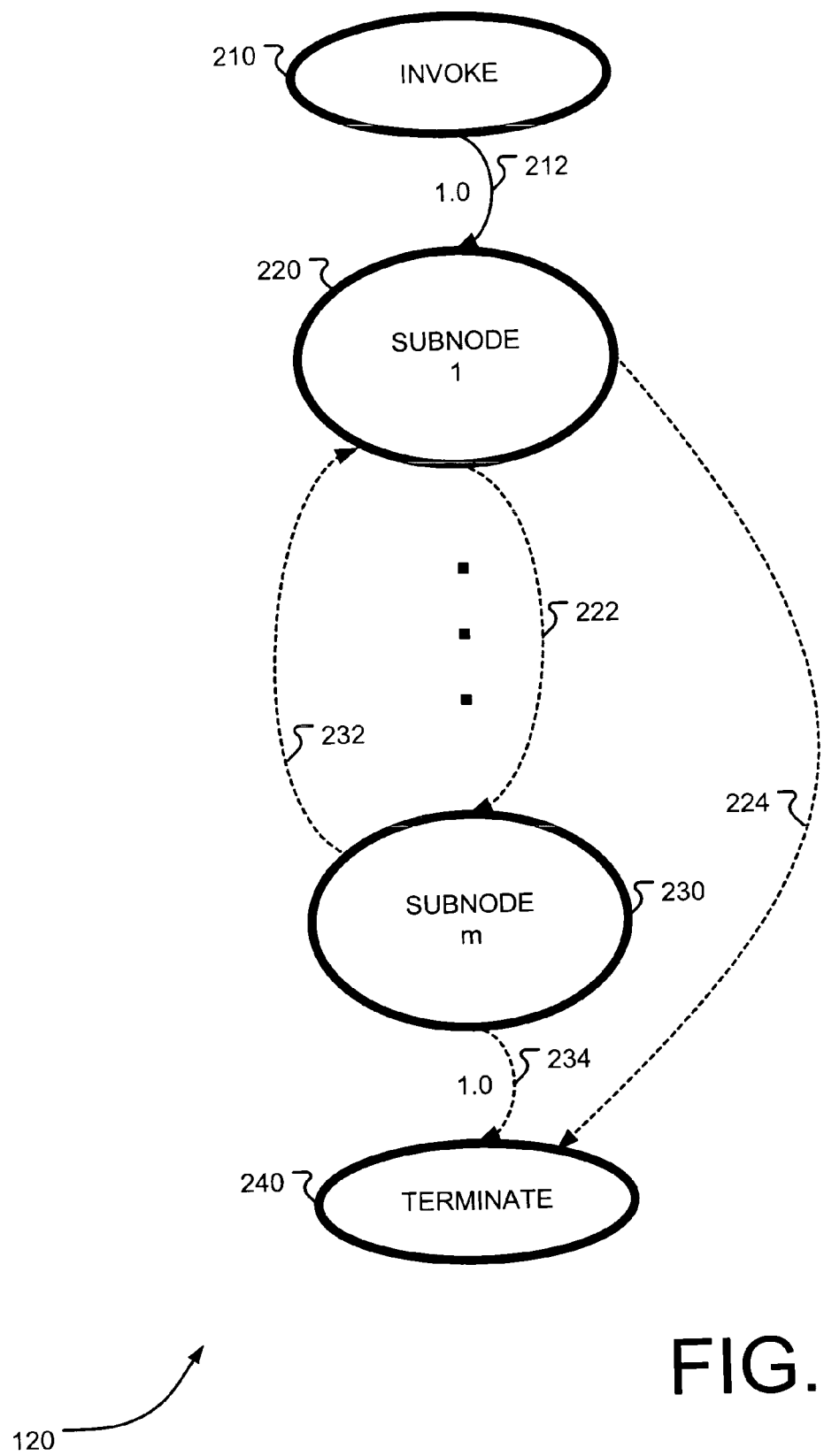
FIG. 2 is a diagram showing a generic submodel representing one of the nodes from FIG. 1.

FIG. 2 is a diagram showing a generic submodel representing, for example, node 120 from FIG. 1. As shown in FIG. 2, the submodel appears similar to the Markov chain usage model of FIG. 1 in that the subprocess begins at a source (represented as "invoke node" 210 ), ends at a sink (represented as "terminate node" 240), and includes various states (represented as "subnode 1" 220 through "subnode m" 230). Again, in the submodel, the various subnodes 220, 230 are connected to each other, either directly or indirectly, via pathways 212, 222, 224, 232, 234 that determine the flow of the process. As one can see, such a structure permits the hierarchical nesting of submodels within models, which may further be nested within larger processes.

Markov chain usage models and hierarchically included submodels may be represented in matrix form. Examples of matrices corresponding to the diagrams of FIGS. 1 and 2 are shown in FIGS. 3A through 4B.

Figure 3A:
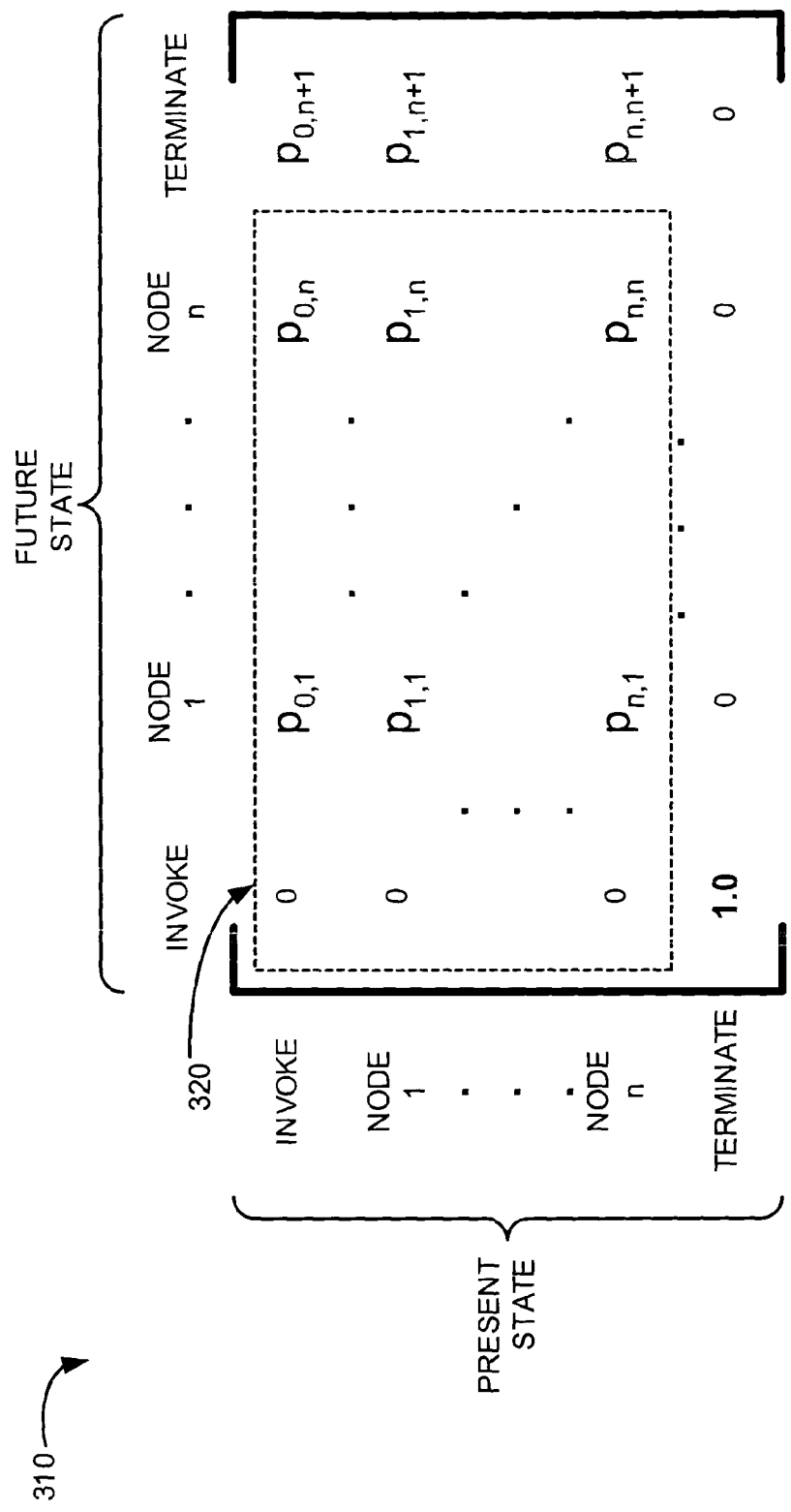
FIG. 3A is a diagram showing a transition matrix representing the Markov chain usage model of FIG. 1.

FIG. 3A is a diagram showing a transition matrix 310 representing the Markov chain usage model 105 of FIG. 1. As shown in FIG. 3A, the transition matrix is a square matrix in which the rows represent a present state while the columns represent a future state. For example, in FIG. 3A, the rows are labeled "invoke," "node 1" . . . "node n," and "terminate," thereby representing each of the nodes or states shown in FIG. 1. Similarly, the columns are labeled "invoke," "node 1" . . . "node n," and "terminate," again representing each of the nodes from FIG. 1.

Each element in the matrix represents a probability of transition from a present state to a future state. For example, in FIG. 3A, when a process is at "node n," the probability that the process will transition to "node 1" is given as $p_{n,1}$, which lies at the intersection of the "node n" row and the "node 1" column. Similarly, the probability that the process will terminate after "node n" is given as $p_{n,n+1}$, which lies at the intersection of the "node n" row and the "terminate" column.

Figure 3B:
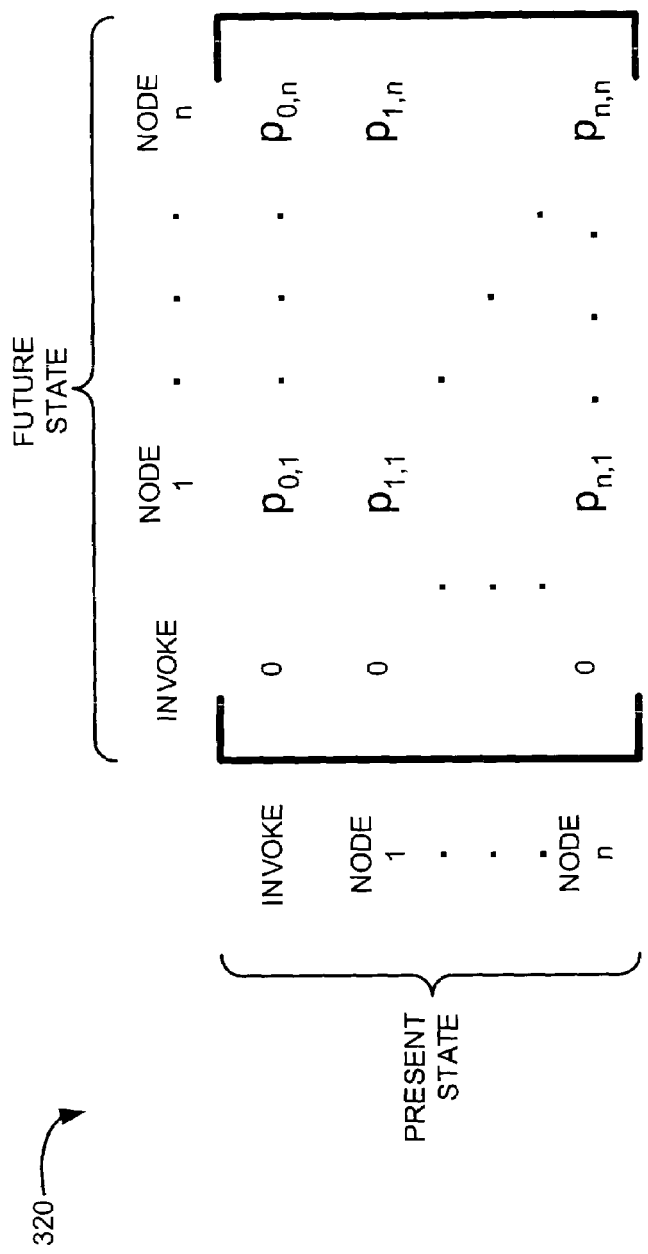
FIG. 3B is a diagram showing a reduced matrix for the Markov chain usage model, in which the elements associated with the sink node (hereinafter also referred to as "sink-node elements") from FIG. 3A have been removed.

For absorbing chains, the transition matrix 310 may also be represented as a reduced matrix 320, in which the sink-node elements (e.g., the terminate elements of FIG. 3A) are removed. The reduced matrix 320 of the Markov chain usage model is shown in FIG. 3B. As shown in FIG. 3B, each of the matrix elements of the reduced model 320 are identical to their corresponding matrix elements from FIG. 3A, with the exception that no terminate elements are present in FIG. 3B. As discussed below, the reduced matrix 320 is used extensively in the testing and analysis of software, or in other processes that are amenable to modeling by Markov chain usage models.

Figure 4A:
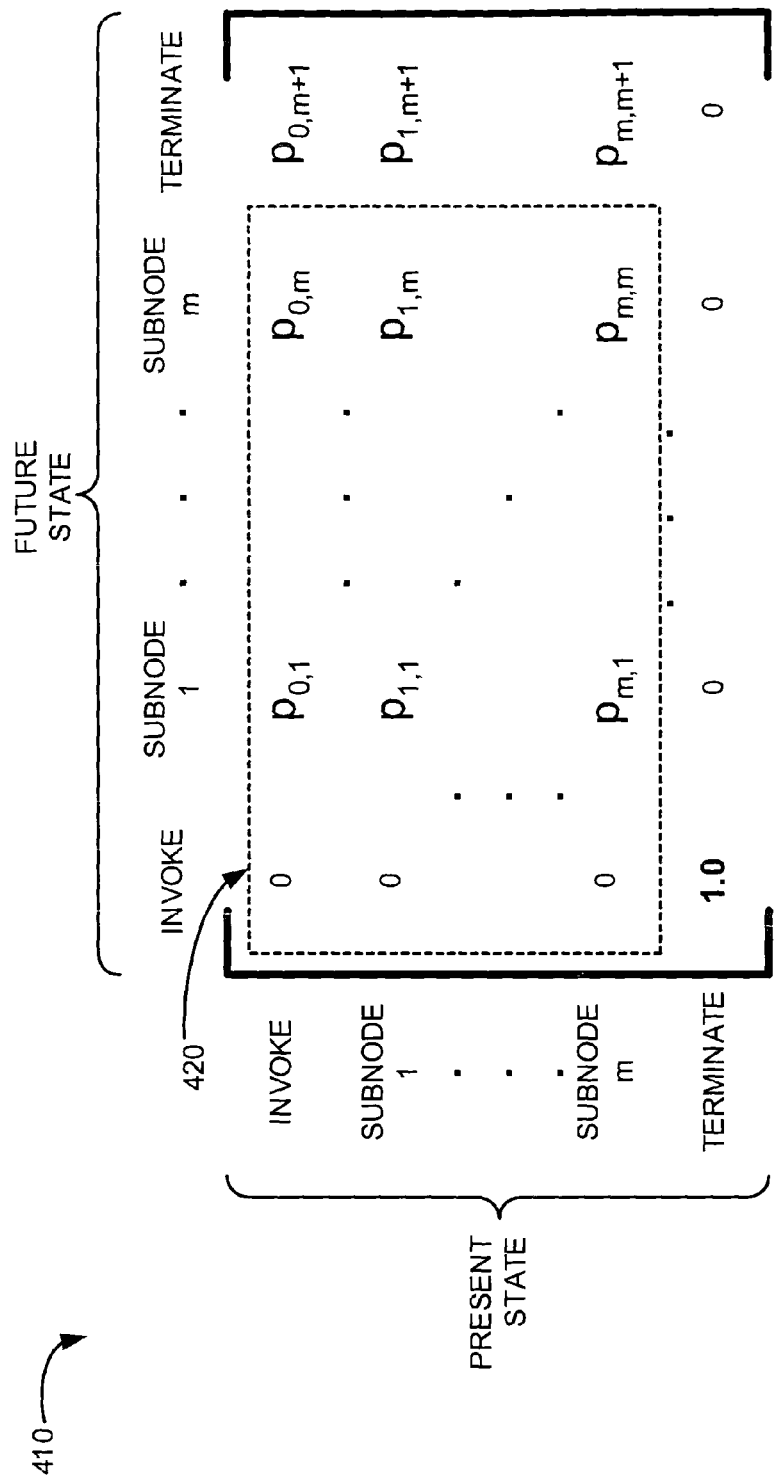
FIG. 4A is a diagram showing a transition matrix representing the submodel of FIG. 2.

FIG. 4A is a diagram showing a transition matrix 410 representing the submodel of FIG. 2. Similar to the matrix of FIG. 3A, each element of the submodel transition matrix 410 represents a probability of transition from a present state to a future state. Since properties of transition matrices have been illustrated in FIG. 3A, further discussion of the transition matrix 410 of FIG. 4A is omitted here. However, it should be appreciated that the transition matrix 410 of the submodel appears similar to the transition matrix 310 of the Markov chain usage model since the submodel 120 of FIG. 2 appears similar to the Markov chain usage model 105 of FIG. 1.

Figure 4B:
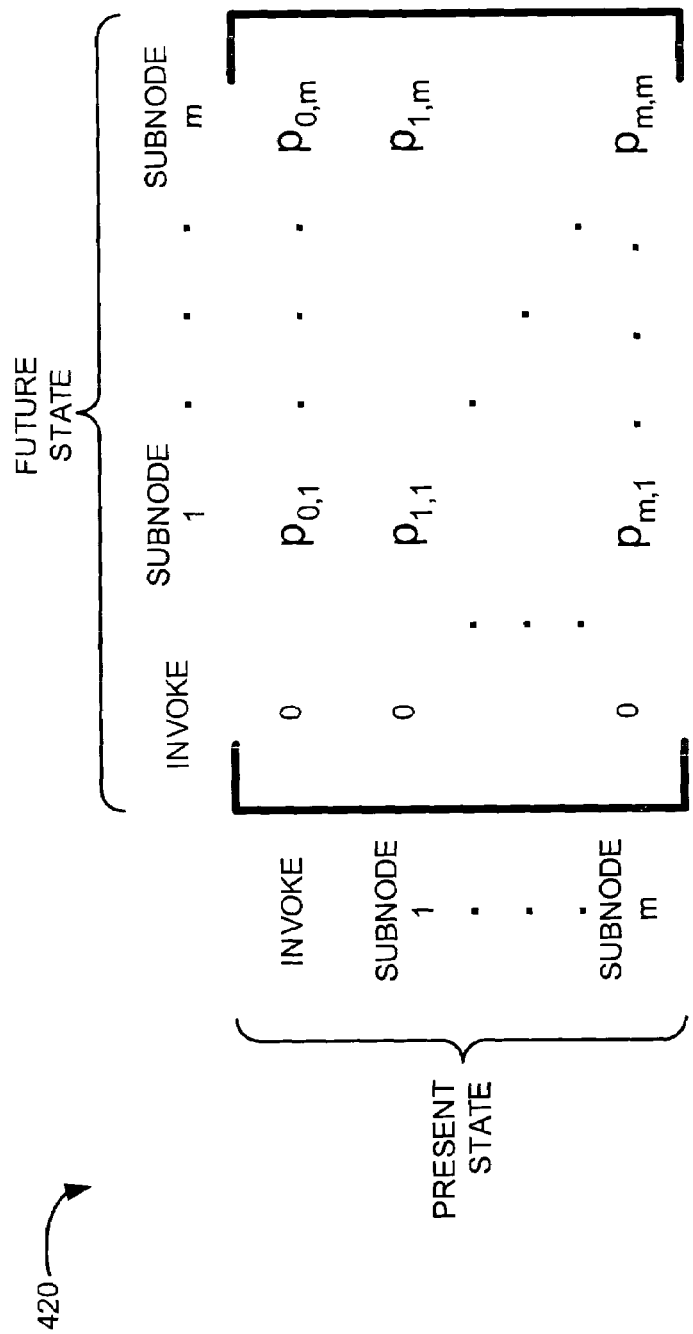
FIG. 4B is a diagram showing a reduced matrix of the submodel, in which the sink-node elements from FIG. 4A have been removed.

FIG. 4B is a diagram showing a reduced matrix 420 of the submodel, in which the sink-node elements from FIG. 4A have been removed. Since the appearance of reduced matrices is illustrated in FIG. 3B, further discussion of the appearance of reduced matrices is omitted here.

When submodels, such as that shown in FIG. 2, are substituted for states within a Markov chain usage model, such as that shown in FIG. 1, the transient submatrix of the Markov chain usage model may be represented as $M=[m_{ij}]$ and the transient submatrix of a submodel of M may be represented as $S=[s_{ij}]$. Such a hierarchical model may be analyzed by flattening the model, in which S is instantiated in M, thereby generating a flattened model F. The transient submatrix of the flattened model may be represented as $F=[f_{ij}]$ Each of the transient sub-matrices M, S, and F has a corresponding first moment matrix $N^M$, $N^S$, and $N^F$, respectively, where:

$$N^M = (I-M)^{-1} \quad [\text{Eq. 1}],$$

$$N^S = (I-S)^{-1} \quad [\text{Eq. 2}],$$

and $$N^F = (I-F)^{-1} \quad [\text{Eq. 3}],$$

where I is the identity matrix.

For Markov chain usage models, the first-row elements of the first moment matrices are of interest since the first-row elements of the first moment matrices provide information on the behavior of the model upon invocation of the process (i.e., the behavior of the model when the process is started from the source node). Similarly, the diagonal elements of the first moment matrices are of interest since the diagonal elements of the first moment matrices provide information on the average number of times a state is revisited after it is initially encountered.

While the flattening of the model provides information on both the first-row elements and the diagonal elements of the first moment matrix of the flattened model, direct inversion of the matrix, (I−F), presents inefficiencies in both calculation complexity and memory requirements. In order to combat some of these inefficiencies, some embodiments of the invention provide for processes in which the first-row elements and the diagonal elements of $N^F$ (also referred to herein as the reduced first moment matrix of an extended model) are calculated without flattening the model. Thus, for some embodiments, rather than flattening the model, the first-row elements and the diagonal elements of $N^F$ are calculated from the elements of $N^M$ and the elements of $N^S$. In other words, once $N^M$ and $N^S$ are known, the first-row elements of $N^F$ and the diagonal elements of $N^F$ may be calculated without flattening the model.

Designating the first row and diagonal of $N^M$ as $[n_{i,j}^M]$ and the first row and diagonal of $N^S$ as $[n_{i,j}^S]$ the first row and diagonal $[n_{i,j}^F]$ of $N^F$ may be obtained using $[n_{i,j}^M]$ and $[n_{i,j}^S]$. In order to avoid confusion, the states in M are indexed using i,j while the states in S are indexed using k,l. Also, in order to avoid confusion, models within a hierarchical model are designated as either a "parent model" or a "child model," depending on whether the model is nesting another model or being nested within another model.

Initially, it should be appreciated that the flow of the flattened model is identical to the flow of the original Markov chain usage model. Hence, the number of times a state in a parent model M is visited is unaffected by instantiating child model S within the parent model M. Thus, if the first row of M is designated as $[n_{1,j}^M]$, then those elements represented in both the flattened model F and the parent model M will have identical values. In other words:

$$n_{1,j}^F = n_{1,j}^M \quad [\text{Eq. 4}]$$

for those elements present in both the parent model M and the flattened model F.

For the elements in the child model S, it should be appreciated that the number of times a state in S is visited will dependent on the number of times S itself is visited, since S is instantiated within M. Also, it should be appreciated that state k in S will be visited $[n_{1,k}^S]$, on average, each time that state S itself is visited. Thus, if S is visited $[n_{1,S}^M]$ times, on average, during the process of M, then those elements present in both the first row of S and the first row of F may be represented as:

$$n_{1,k}^F = n_{1,S}^M \cdot n_{1,k}^S \quad [\text{Eq. 5}].$$

Similar reasoning applies to the diagonal elements of $N^F$. As described above, the number of times a state in M is visited is not changed by instantiating S in M. Hence, if the diagonal of M is designated as $[n_{j,j}^M]$ then those elements represented in both the flattened model F and the parent model M will have identical values. In other words:

$$n_{j,j}^F = n_{j,j}^M \quad [\text{Eq. 6}]$$

for those elements present in both the parent model M and the flattened model F.

The diagonal elements of $N^S$ are represented as $[n_{k,k}^S]$ in accordance with the nomenclature defined above. In other words, for the diagonal elements in S, the process begins in state k, once S is invoked, and visits itself $n_{k,k}^S$ times prior to exiting S. Thereafter, S is revisited ($n_{S,S}^M - 1$) times from within M. Thus, the remaining diagonal elements may be represented as:

$$n_{k,k}^F = n_{k,k}^S + (n_{S,S}^M - 1) \cdot n_{1,k}^S \quad [\text{Eq. 7}].$$

Thus, Eqs. 4 through 7 provide an approach to determining the first row and the diagonal elements of $N^F$ without directly inverting the matrix (I−F). In this regard, Eqs. 4 through 7 provide a more efficient approach that reduces the time complexity of calculation from approximately $O((a+b)^3)$ to approximately $O(4 \cdot (a+b))$. Eqs. 4 through 7 also provide a corresponding efficiency in space required to store the results, from approximately $O((a+b)^2)$ to approximately $O(2 \cdot (a+b))$.

Figure 5:
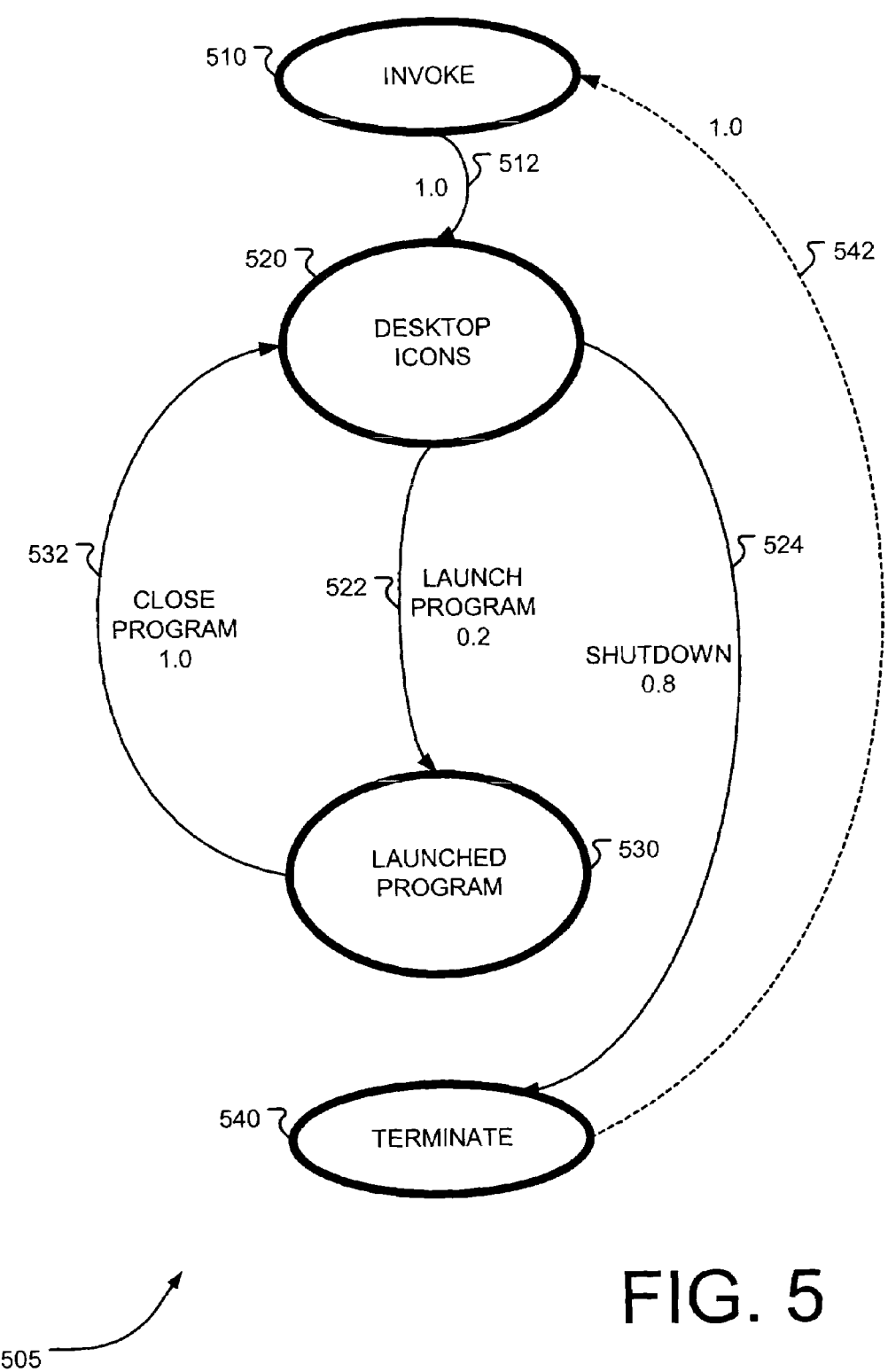
FIG. 5 is a diagram showing a specific example of a Markov chain usage model.
Figure 6:
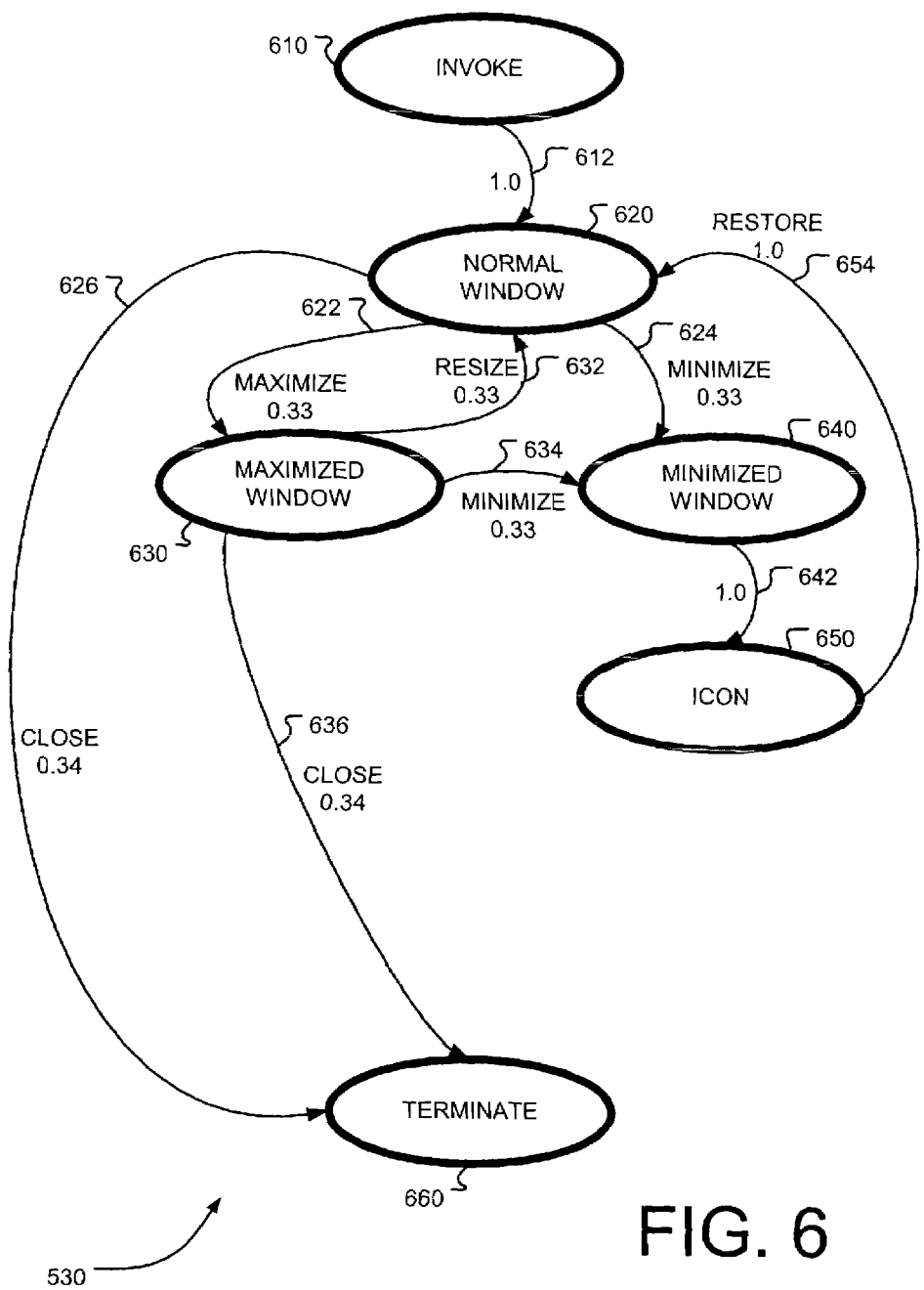
FIG. 6 is a diagram showing a submodel representing various states in one of the nodes of FIG. 5.
Figure 7:
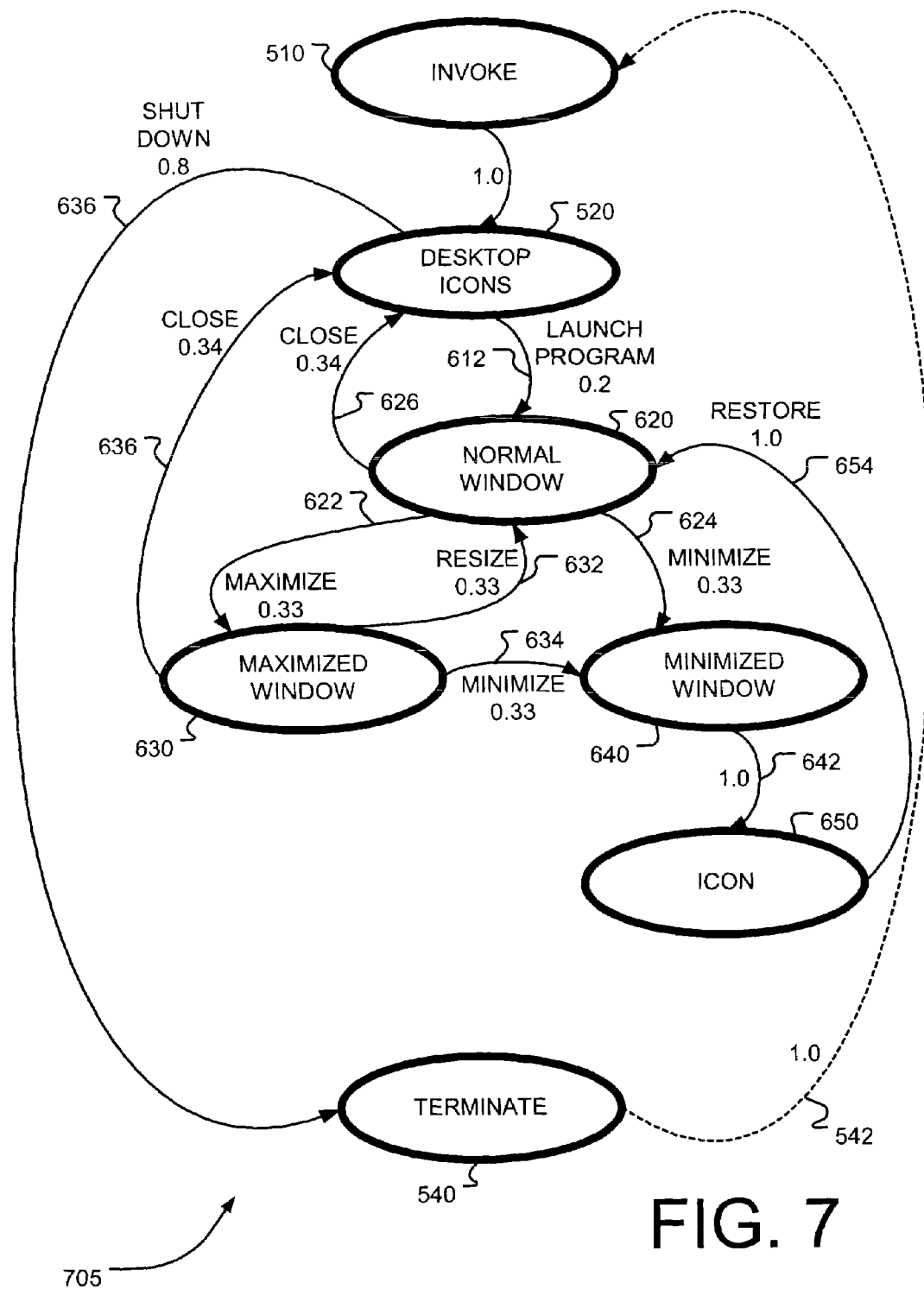
FIG. 7 is a diagram showing a flattened model, which represents the combined states from both FIGS. 5 and 6.

FIGS. 5 through 7 are diagrams showing specific examples of a Markov chain usage model 505 (also referred to as a parent model) and corresponding submodels (also referred to as child models) within the parent model. The models in FIGS. 5 through 7 provide a basis for the matrix representations and their corresponding mathematical derivations described below. Specifically, FIGS. 5 through 7 show processes that may be associated with the use of a computer after a user has turned on the computer. It should be appreciated that the states and transition probabilities in the examples have been fabricated for purposes of illustration. Hence, the states and probabilities are provided to more clearly describe various aspects of the invention and are not intended to limit the scope of the invention.

FIG. 5 shows a process that may occur when a user turns on a computer with a graphical user interface (GUI) environment. The act of turning on the computer is represented by the invoke state 510. From the invoke state 510, the process shows a transition to desktop icons state 520, which occurs with a probability of 1.0. Given that the transition probability from the invoke state 510 to the desktop icons state 520 is 1.0, the desktop icons state 520 always occurs when the process of FIG. 5 is invoked. In some examples of the desktop icons state 520, the GUI environment may display one or more desktop icons, such as shortcuts to executable computer programs, for the user to select and launch.

From the desktop icons state 520, the process shows two paths 522, 524. One path provides a transition from the desktop icons state 520 to a launched program state 530, while the other path provides a transition from the desktop icons state 520 to a terminate state 540. The launch program state 530 may represent a subprocess in which the user has opened a window and is manipulating attributes or characteristics of the opened window. An example of such a subprocess is shown in FIG. 6. The terminate state 540 represents a sink, such as a shut down or a logout, which ends the process.

The path from the desktop icons state 520 to the launched program state 530 is assigned a transition probability of 0.2 while the path from the desktop icons state 520 to the terminate state 540 is assigned a transition probability of 0.8. The assigned probability values indicate that, twenty percent of the time, the user selects and launches a program while, for the remaining eighty percent of the time, the user simply terminates the process (e.g., shutting down the computer or logging out).

In the example of FIG. 5, once the process is in the launched program state 530, the only possible transition is the desktop icons state 520, as evidenced by the 1.0 probability value assigned to the transition from the launched program state 530 to the desktop icons state 520. In other words, an exit from the launched program state 530 necessarily reverts the process back to the desktop icons state 520 and no other state. As briefly noted above, the launched program state 530 may represent a subprocess that entails further nested processes. One example of a subprocess is shown in FIG. 6.

FIG. 6 is a diagram showing a submodel representing the launched program state 530 of FIG. 5 as a subprocess. As shown in FIG. 6, the subprocess of FIG. 6 includes an invoke state 610 and a terminate state 660, which represent a source and a sink, respectively. The invoke state 610 represents the invoking of the launched program state 530 from the desktop icons state 520 of FIG. 5. The terminate state 660 represents the exiting of the subprocess by, for example, closing the opened window. In this regard, the exiting of the subprocess returns the process to the desktop icons state 520 of FIG. 5.

In addition to the invoke state 610 and the terminate state 660, the subprocess further includes a normal window state 620, a maximized window state 630, a minimized window state 640, and an icon state 650. For illustrative purposes, the normal window state 620 represents a state in which a program window is opened, and the program window is not maximized to fill the entire display screen. The maximized window state 630 represents a state in which the program window is maximized to occupy the entire display screen. The minimized window state 640 represents a state in which the program window is minimized and, hence, occupies no portion of the display screen. The icon state 650 represents a state in which the program window is represented as an icon in one portion of the display screen, rather than as any type of opened window.

The transition probabilities from each of the various states in the subprocess are also shown in FIG. 6. The invoke state 610 transitions to the normal window state 620 with a probability of 1.0. The normal window state 620 may transition to one of three different states. In one transition, the normal window state 620 transitions to the maximized window state 630 with a probability of 0.33. In another transition, the normal window state 620 transitions to the minimized window state 640 with a probability of 0.33. In yet another transition, the normal window state 620 transitions to the terminate state 660 with a probability of 0.34.

The maximized window state 630 may transition to one of three different states. In one transition, the maximized window state 630 may transition to the minimized window state 640 with a probability of 0.33. In another transition, the maximized window state 630 may transition back to the normal window state 620 with a probability of 0.33. In yet another transition, the maximized window state 630 may transition to the terminate state 660 with a probability of 0.34.

The minimized window state 640 has only one possible transition to the icon state 650. Similarly, the icon state 650 has only one possible transition to the normal window state 620.

These probability values indicate that, once the subprocess associated with the launched program state 530 is invoked, a normal window is always opened (probability of 1.0). From the normal window, there is almost an equal likelihood that the user may either maximize the normal window, minimize the normal window, or close the window. If the user has maximized the window, then, again, there is an almost equal likelihood that the user may either minimize the window, return to the normal window, or close the window. As shown in FIG. 6, the minimizing of any window will lead to the displaying of an icon, which represents the window. When the user selects the icon, the normal window will again be displayed to the user.

While arcs 626 and 636 are shown to have the same destination (the terminate node 540 in the parent model), some processes may have arcs leading to different destinations. For example, the closing of the maximized window 630 may result in the desktop icon state 520 in the parent model 505, while the closing of the normal window 620 may result in the terminate state 540 in the parent model 505. If the destinations are different, the probabilities of the two arcs exiting the submodel 530 would depend on the probability of occurrence of the arcs 626 and 636 within the submodel. The probability is given by:

$$p_{S,j}^{M} = \frac{n_{1,l}^{S} p_{l,sink}^{S}}{1 + n_{sink,k}^{S} p_{k,l}^{S}}.$$ [Eq. 29]

Since:

$$n_{sink,k}^{S} = 0$$ [Eq. 30],

Eq. 29 reduces to:

$$p_{S,j}^{M} = n_{1,l}^{S} p_{1,sink}^{S}$$ [Eq. 31].

As shown in Eqs. 29 through 31, only the first row of the submodel's first moment matrix is needed to maintain consistency within the hierarchy, thereby permitting closed-form computation of probability occurrences for arcs.

As seen from FIGS. 5 and 6, the launched program state 530, which is shown as a single node in the parent model, may represent a nested subprocess, which is shown as the child model of FIG. 6. The states in both the parent model (FIG. 5) and the child model (FIG. 6) may be displayed together in a flattened model similar to that shown in FIG. 7.

FIG. 7 is a diagram showing a flattened model 705, which represents the combined states from both the parent model 505 and the child model 530 of FIGS. 5 and 6, respectively. As shown in FIG. 7, the flattened model 705 includes each and every state that is present in both the parent model 505 and the child model 530, with the exception of the invoke state 610 and the terminate state 660 of the child model 530. From FIG. 7, it should be appreciated that the child model 530 is fully instantiated in the parent model 505, thereby preserving all of the transition pathways and their probabilities. Since flattened models are known in the art, further discussion of FIG. 7 is omitted here.

Having described FIGS. 5 through 7, attention is turned to FIGS. 8A through 10B, which are transition matrix repre sentations of the Markov chain usage model of FIG. 5, the submodel of FIG. 6, and the flattened model of FIG. 7.

Figure 8A:
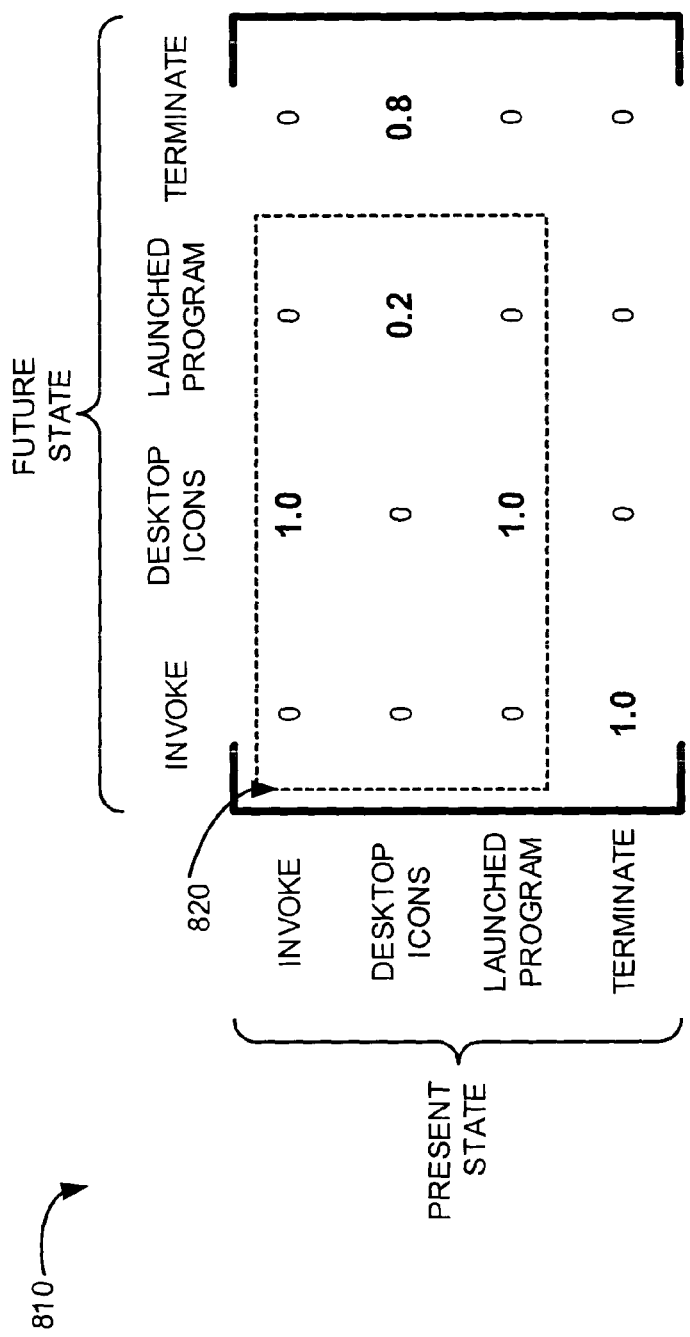
FIG. 8A is a diagram showing a transition matrix representing the Markov chain usage model of FIG. 5.

FIG. 8A is a diagram showing a transition matrix 810 representing the Markov chain usage model of FIG. 5. As described above, the rows of the matrix represent current states in the model and the columns of the matrix represent future states in the model. Hence, again, each matrix element represents the transition probability from one state to another state. For example, the transition probability from the desktop icons state to the launched program state is shown to be 0.2 (i.e., $p_{i=desktop, j=launched}=0.2$), which corresponds to the probability of the transition pathway between the desktop icons state and the launched program state of FIG. 5. As shown in FIG. 8A, each element in the transition matrix 810 represents a probability of transition from a present state to a future state. Hence, given the assigned probability values from FIG. 5, the transition matrix $p_{i,j}^M$ is given as:

$$P_{i,j}^M = \begin{bmatrix} 0.0 & 1.0 & 0.0 & 0.0 \\ 0.0 & 0.0 & 0.2 & 0.8 \\ 0.0 & 1.0 & 0.0 & 0.0 \\ 1.0 & 0.0 & 0.0 & 0.0 \end{bmatrix}. \quad [\text{Eq. 8}]$$

Figure 8B:
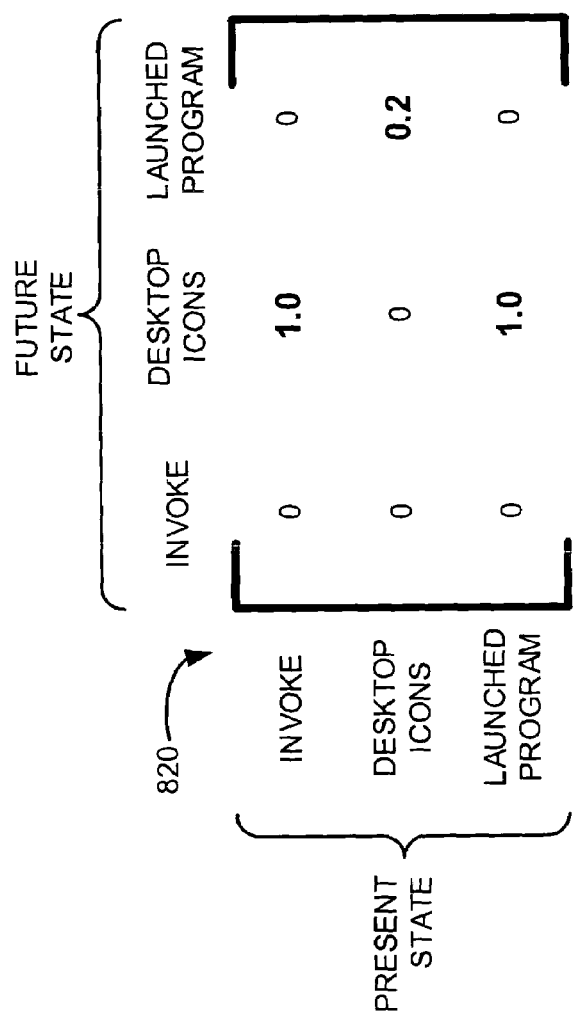
FIG. 8B is a diagram showing a reduced matrix of the Markov chain usage model, in which the sink-node elements of FIG. 8A have been removed.

As shown in FIG. 8A, the sum of the elements in each row results in a combined probability of 1.0. Also, as shown in FIGS. 8A and 8B, a reduced matrix 820 may be derived from the transition matrix by eliminating the probabilities associated with the terminate state. The reduced matrix $Q_{i,j}^M$ may be represented as:

$$Q_{i,j}^M = \begin{bmatrix} 0.0 & 1.0 & 0.0 \\ 0.0 & 0.0 & 0.2 \\ 0.0 & 1.0 & 0.0 \end{bmatrix}. \quad [\text{Eq. 9}]$$

As shown below, the reduced matrix of Eq. 9 may be used to derive the first moment matrix of the parent model. In order to avoid confusion between the first moment matrix of the parent model and the first moment matrix of the child model, the first moment matrix of the parent model is also referred to herein as the parent matrix while the first moment matrix of the child model is also referred to herein as the child matrix.

Figure 9A:
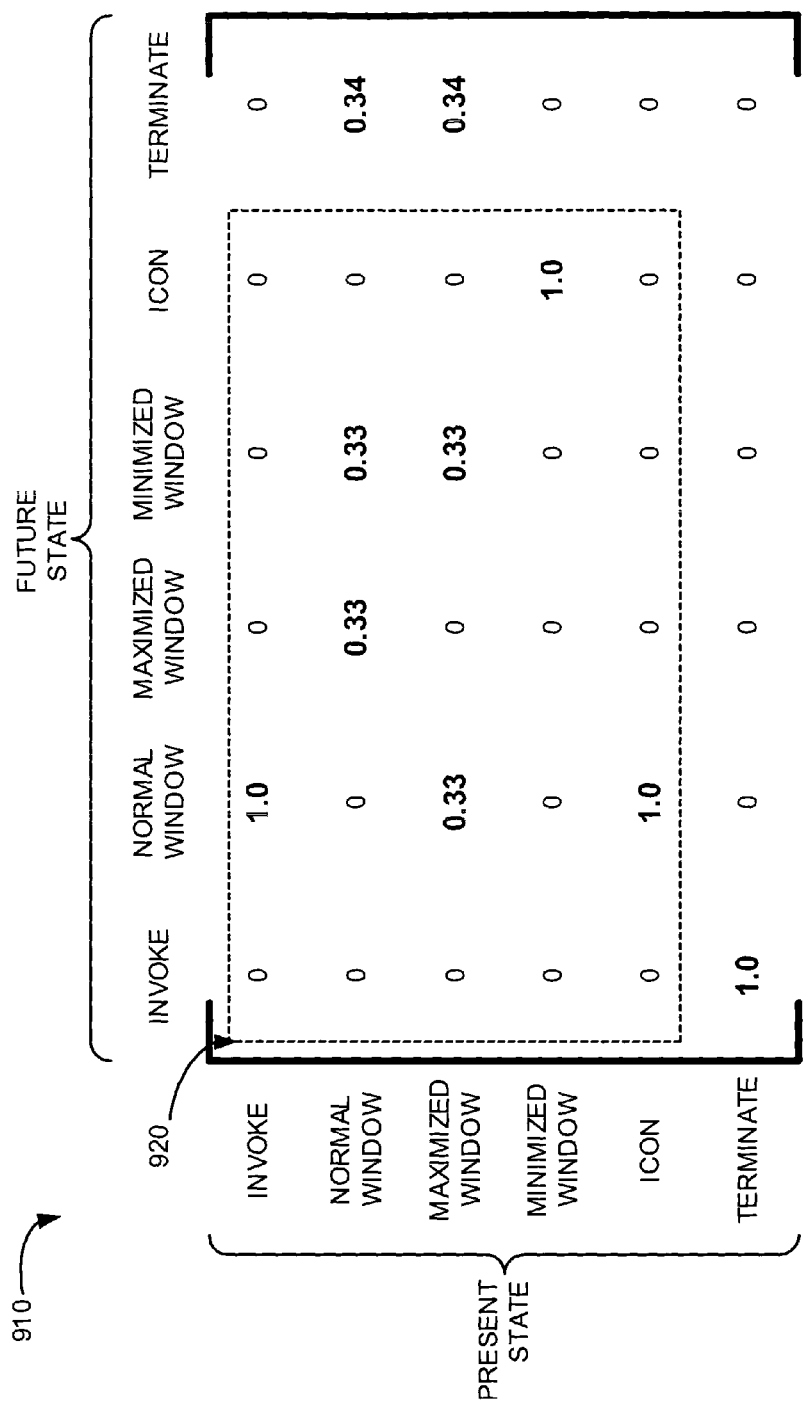
FIG. 9A is a diagram showing a transition matrix representing the submodel of FIG. 6.

FIG. 9A is a diagram showing a transition matrix representing the submodel of FIG. 6. Similar to FIGS. 8A and 8B, the rows of the matrix represent present states in the model and the columns of the matrix represent future states in the model. Hence, again, each matrix element represents the transition probability from one state to another state. For example, the transition probability from the normal window state to the maximized window state is shown to be 0.33 (i.e., $p_{k=normal, l=maximized}=0.33$), which corresponds to the probability of the transition pathway between the normal window state and the maximized window state of FIG. 6. Again, each element in the transition matrix 910 represents a probability of transition from a present state to a future state. Hence, given the assigned probability values from FIG. 6, the transition matrix $P_{k,l}^S$ is given as:

$$P_{k,l}^S = \begin{bmatrix} 0.00 & 1.00 & 0.00 & 0.00 & 0.00 & 0.00 \\ 0.00 & 0.00 & 0.33 & 0.33 & 0.00 & 0.34 \\ 0.00 & 0.33 & 0.00 & 0.33 & 0.00 & 0.34 \\ 0.00 & 0.00 & 0.00 & 0.00 & 1.00 & 0.00 \\ 0.00 & 1.00 & 0.00 & 0.00 & 0.00 & 0.00 \\ 1.00 & 0.00 & 0.00 & 0.00 & 0.00 & 0.00 \end{bmatrix}. \quad [\text{Eq. 10}]$$

Figure 9B:
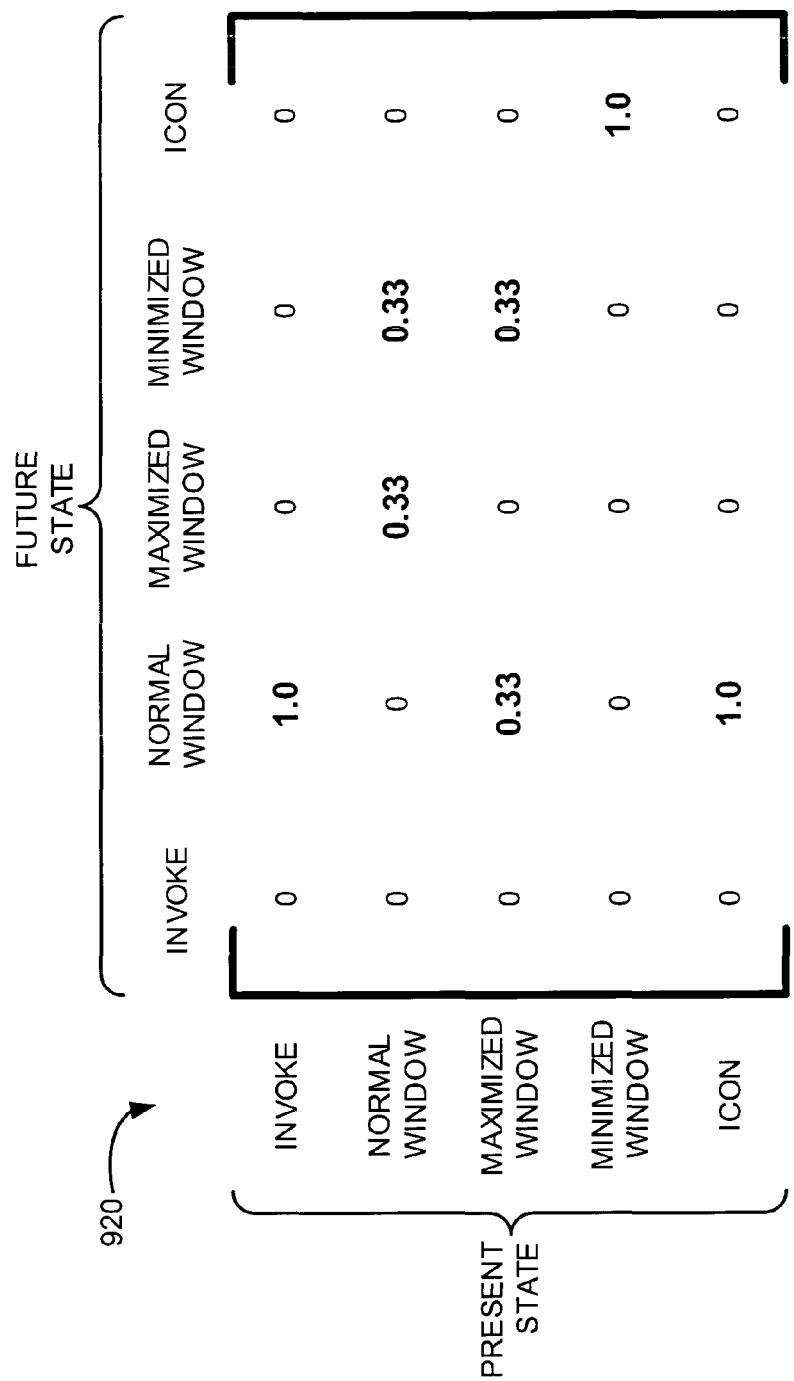
FIG. 9B is a diagram showing a reduced matrix of the submodel, in which the sink-node elements of FIG. 9A have been removed.

As shown in FIGS. 9A and 9B, a reduced matrix 920 may be derived from the transition matrix by eliminating the probabilities associated with the terminate state. The reduced matrix $Q_{k,l}^S$ may be given as:

$$Q_{k,l}^S = \begin{bmatrix} 0.00 & 1.00 & 0.00 & 0.00 & 0.00 \\ 0.00 & 0.00 & 0.33 & 0.33 & 0.00 \\ 0.00 & 0.33 & 0.00 & 0.33 & 0.00 \\ 0.00 & 0.00 & 0.00 & 0.00 & 1.00 \\ 0.00 & 1.00 & 0.00 & 0.00 & 0.00 \end{bmatrix}. \quad [\text{Eq. 11}]$$

As shown below, the reduced matrix of Eq. 11 may be used to derive the first moment matrix of the child model.

Figure 10B:
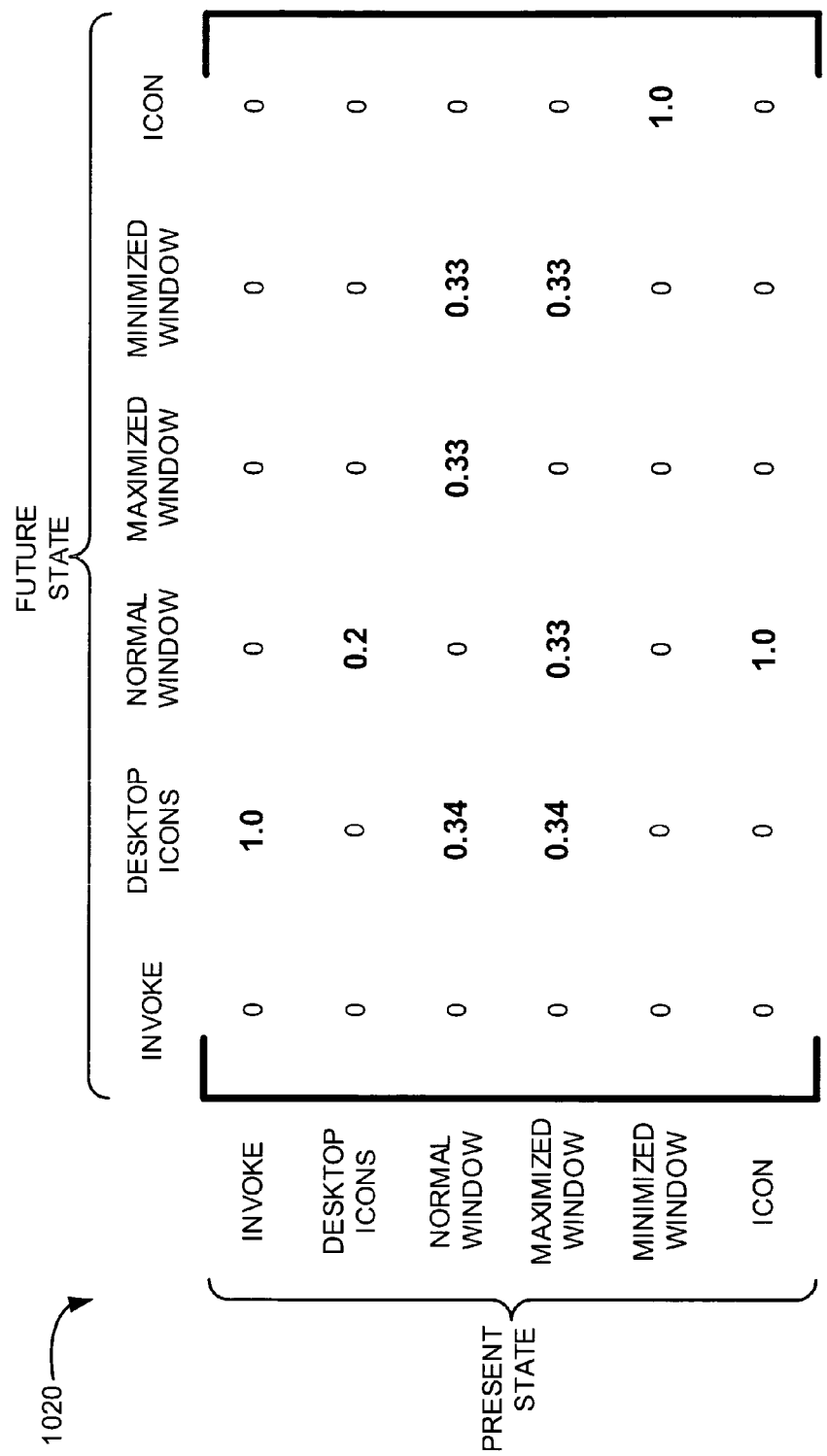
FIG. 10B is a diagram showing a reduced matrix for the flattened model, in which the sink-node elements of FIG. 10A have been removed.

FIGS. 10A and 10B are diagrams showing a transition matrix 1010 and a reduced matrix 1020, which represent the flattened model of FIG. 7. While the several embodiments disclosed herein do not deal with the flattened model, FIGS. 7, 10A, and 10B are provided to show that the results obtained using the disclosed embodiments are congruent with the results obtained using the flattened model. In other words, FIGS. 10A and 10B are provided to show that the first row and diagonal of the flattened model may be obtained without actually flattening the model prior to calculation.

As shown in FIG. 10A, the elements $P_{m,n}^F$ in the transition matrix 1010 of the flattened model are given as:

$$P_{k,l}^S = \begin{bmatrix} 0.00 & 1.00 & 0.00 & 0.00 & 0.00 & 0.00 & 0.00 \\ 0.00 & 0.00 & 0.20 & 0.00 & 0.00 & 0.00 & 0.8 \\ 0.00 & 0.34 & 0.00 & 0.33 & 0.33 & 0.00 & 0.00 \\ 0.00 & 0.34 & 0.33 & 0.00 & 0.33 & 0.00 & 0.00 \\ 0.00 & 0.00 & 0.00 & 0.00 & 0.00 & 1.00 & 0.00 \\ 0.00 & 0.00 & 1.00 & 0.00 & 0.00 & 0.00 & 0.00 \\ 1.00 & 0.00 & 0.00 & 0.00 & 0.00 & 0.00 & 0.00 \end{bmatrix}, \quad [\text{Eq. 12}]$$

while the elements $Q_{m,n}^F$ in the reduced matrix 1020 of the flattened model are given as:

$$Q_{m,n}^F = \begin{bmatrix} 0.00 & 1.00 & 0.00 & 0.00 & 0.00 & 0.00 \\ 0.00 & 0.00 & 0.20 & 0.00 & 0.00 & 0.00 \\ 0.00 & 0.34 & 0.00 & 0.33 & 0.33 & 0.00 \\ 0.00 & 0.34 & 0.33 & 0.00 & 0.33 & 0.00 \\ 0.00 & 0.00 & 0.00 & 0.00 & 0.00 & 1.00 \\ 0.00 & 0.00 & 1.00 & 0.00 & 0.00 & 0.00 \end{bmatrix}. \quad [\text{Eq. 13}]$$

From the matrices in Eqs. 8 through 13, the first moment matrices $N^M$, $N^S$, and $N^F$ may be derived using Eqs. 1 through 3. The derived first moment matrices for N, S, and F are:

$$N_{i,j}^{M} = \begin{bmatrix} 1.00 & 1.25 & 0.25 \\ 0.00 & 1.25 & 0.25 \\ 0.00 & 1.25 & 1.25 \end{bmatrix},$$ [Eq. 14]

$$N_{k,l}^{S} = \begin{bmatrix} 1.00 & 2.21 & 0.73 & 0.97 & 0.97 \\ 0.00 & 2.21 & 0.73 & 0.97 & 0.97 \\ 0.00 & 1.46 & 1.48 & 0.97 & 0.97 \\ 0.00 & 2.21 & 0.73 & 1.97 & 1.97 \\ 0.00 & 2.21 & 0.73 & 0.97 & 1.97 \end{bmatrix},$$ [Eq. 15]

and $$N_{m,n}^{F} = \begin{bmatrix} 1.00 & 1.25 & 0.55 & 0.18 & 0.24 & 0.24 \\ 0.00 & 1.25 & 0.55 & 0.18 & 0.24 & 0.24 \\ 0.00 & 1.25 & 2.76 & 0.91 & 1.21 & 1.21 \\ 0.00 & 1.25 & 2.01 & 1.66 & 1.21 & 1.21 \\ 0.00 & 1.25 & 2.76 & 0.91 & 2.21 & 2.21 \\ 0.00 & 1.25 & 2.76 & 0.91 & 1.21 & 2.21 \end{bmatrix},$$ [Eq. 16]

respectively, where each element is rounded to the second decimal place.

As described with reference to FIGS. 1 through 4B and Eqs. 4 through 7, the first-row elements and the diagonal elements of Eq. 12 may be derived from the elements of Eqs. 14 and 15 without generating the matrix of Eq. 16. In other words, once the matrices of Eqs. 14 and 15 have been generated, the matrix of Eq. 16 may be generated without flattening the model. In order to distinguish between the result of direct inversion and the result obtained using the disclosed processes, the resulting first moment matrix from the traditional approach is referred to herein as a flattened matrix while the resulting first moment matrix from the disclosed approach is referred to herein as an expanded matrix.

Recalling Eqs. 4 through 7, the first row and diagonal elements for the parent model, the child model, and the flattened model relate according to:

$$n_{1,j}^{F} = n_{1,j}^{M}$$ [Eq. 4], $$n_{1,k}^{F} = n_{1,S}^{M} n_{1,k}^{S}$$ [Eq. 5], $$n_{j,j}^{F} = n_{j,j}^{M}$$ [Eq. 6], and $$n_{k,k}^{F} = n_{k,k}^{S} + (n_{S,S}^{M} - 1) \cdot n_{1,k}^{S}$$ [Eq. 7].

Thus, as shown in FIGS. 5 through 7, the elements common to the parent model (FIG. 5) and the flattened model (FIG. 7) are the invoke state 510, the desktop icons state 520, and the terminate state 540. Also, the elements common to the child model (FIG. 6) and the flattened model (FIG. 7) are the normal window state 620, the maximized window state 630, the minimized window state 640, and the icon state 650.

Given the matrices of Eqs. 14 and 15, the first-row elements and diagonal elements are derived below using Eqs. 4 through 7, without flattening the model.

For example, $n_{invoke,invoke}$, which is the first element in the first row, is present in both the parent model and the flattened model. Hence, according to both Eqs. 4 and 6, the $n_{invoke,invoke}$ element should have the same value in both $N^M$ and $N^F$. As shown above, the first element of the first row in both Eq. 14 and Eq. 16 has a value of:

$$n_{invoke,invoke} = 1.00$$ [Eq. 17], which corroborates Eqs. 4 and 6. Similarly, Eqs. 14 and 16 show an agreement in that:

$$n_{invoke,desktop} = 1.25$$ [Eq. 18]

and $$n_{desktop,desktop} = 1.25$$ [Eq. 19], thereby further corroborating Eqs. 4 and 6.

Turning now to the corroboration of Eq. 5, the first row of $N^F$ and the first row of $N^S$ share the transition paths $\{n_{invoke,normal}, n_{invoke,maximize}, n_{invoke,minimize}, n_{invoke,icon}\}$. However, as shown in Eqs. 15 and 16, the $N^S$ array has the values:

$$n_{1,k}^{S} = \{2.21, 0.74, 0.97, 0.97\}$$ [Eq. 20], while the $N^F$ array has the values:

$$n_{1,k}^{F} = \{0.55, 0.18, 0.24, 0.24\}$$ [Eq. 21],

Since S is wholly instantiated within N, the element $n_{1,S}^{M}$ is $n_{invoke,launch}^{M}$, a which has a value of 0.25. Employing Eq. 5, the first row elements of $N^F$ may be derived as:

$$n_{1,k}^{F} = 0.25 \cdot \{(2.21), (0.73), (0.97), (0.97)\}$$ [Eq. 22], or $$n_{1,k}^{F} = \{0.55, 0.18, 0.24, 0.24\}$$ [Eq. 23].

As seen here, the agreement between Eqs. 21 and 23 also corroborates the Eq. 5.

Turning now to the corroboration of Eq. 7, the diagonal elements of $N^F$ and the diagonal elements of $N^S$ include $\{n_{normal,normal}, n_{maximize,maximize}, n_{minimize,minimize}, n_{icon,icon}\}$. However, as shown in Eqs. 15 and 16, the $N^S$ diagonal elements have values:

$$n_{k,k}^{S} = \{2.21, 1.48, 1.97, 1.97\}$$ [Eq. 24], while the $N^F$ diagonal elements have values:

$$n_{k,k}^{F} = \{2.76, 1.66, 2.21, 2.21\}$$ [Eq. 25],

Since S is wholly instantiated within N, the element $n_{S,S}^{M}$ is given by:

$$n_{S,S}^{M} = n_{invoke,invoke}^{M} = 1.25$$ [Eq. 26], which has a value of 1.25 according to Eq. 14. Also, recalling that $n_{1,k}^{S}$ is:

$$n_{1,k}^{S} = \{2.21, 0.74, 0.97, 0.97\}$$ [Eq. 20], the diagonal elements of $N^F$ may be derived according to Eq. 7 by combining the information obtained from Eqs. 24, 26, and 20, such that:

$$n_{k,k}^{F} = 0.25 \cdot \begin{cases} (2.21 + (1.25 - 1.00) \cdot 2.21), \\ (1.48 + (1.25 - 1.00) \cdot 0.74), \\ (1.97 + (1.25 - 1.00) \cdot 0.97), \\ (1.97 + (1.25 - 1.00) \cdot 0.97), \end{cases}$$ [Eq. 27]

or

-continued $$n_{1,k}^F = \{2.76, 1.66, 2.21, 2.21\}. \quad \text{[Eq. 28]}$$

As seen here, the agreement between Eqs. 25 and 28 corroborates the Eq. 7. In this regard, the specific example of Eqs. 8 through 31 demonstrate that the first row elements of $N^F$ and the diagonal elements of $N^F$ may be calculated using Eqs. 4 through 7, rather than by directly calculating the inverse of the matrix (I–F). The demonstrated approach results in greater efficiency than previously-implemented approaches.

Figure 11:
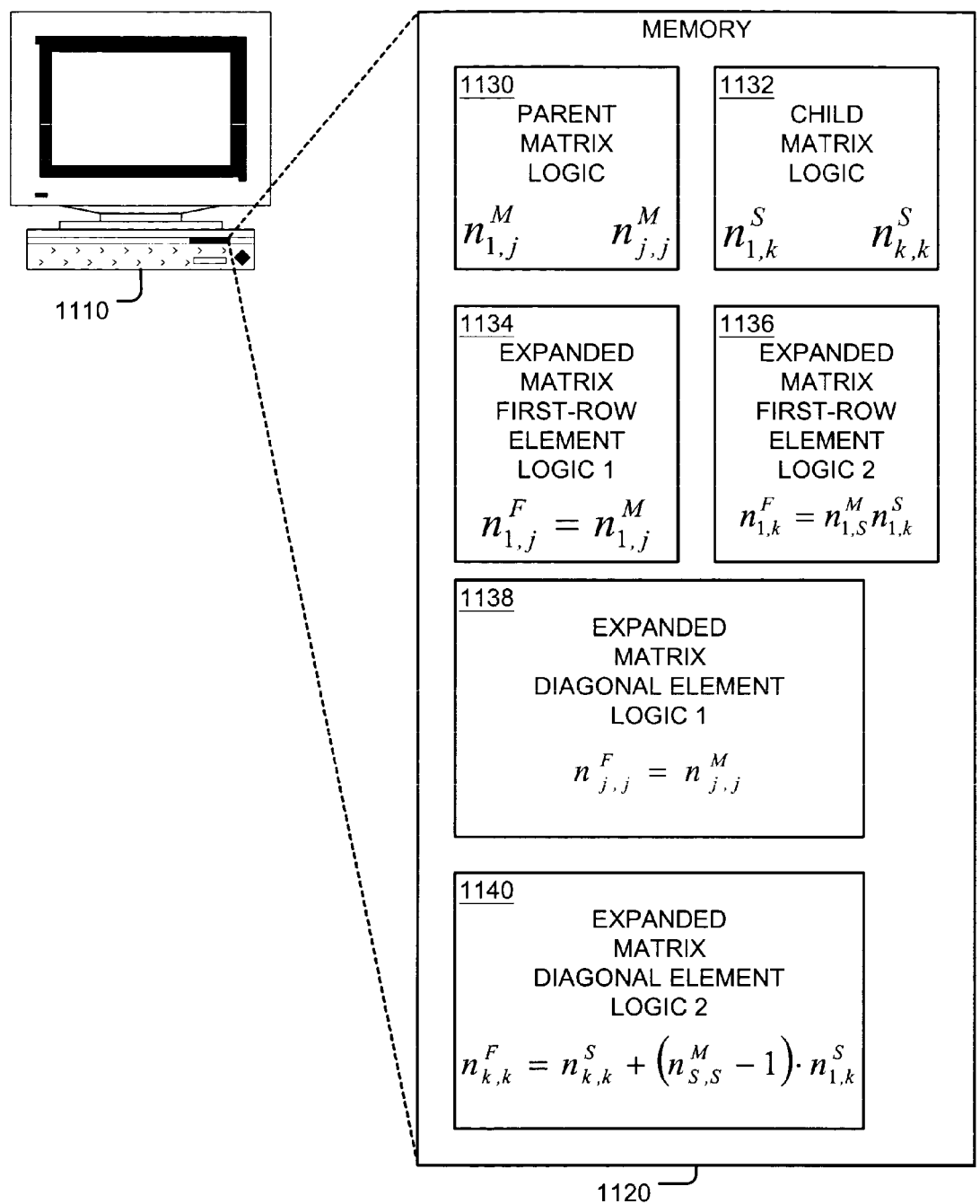
FIG. 11 is a block diagram showing an embodiment of a system for determining elements of a first moment matrix of a flattened model.
Figure 12:
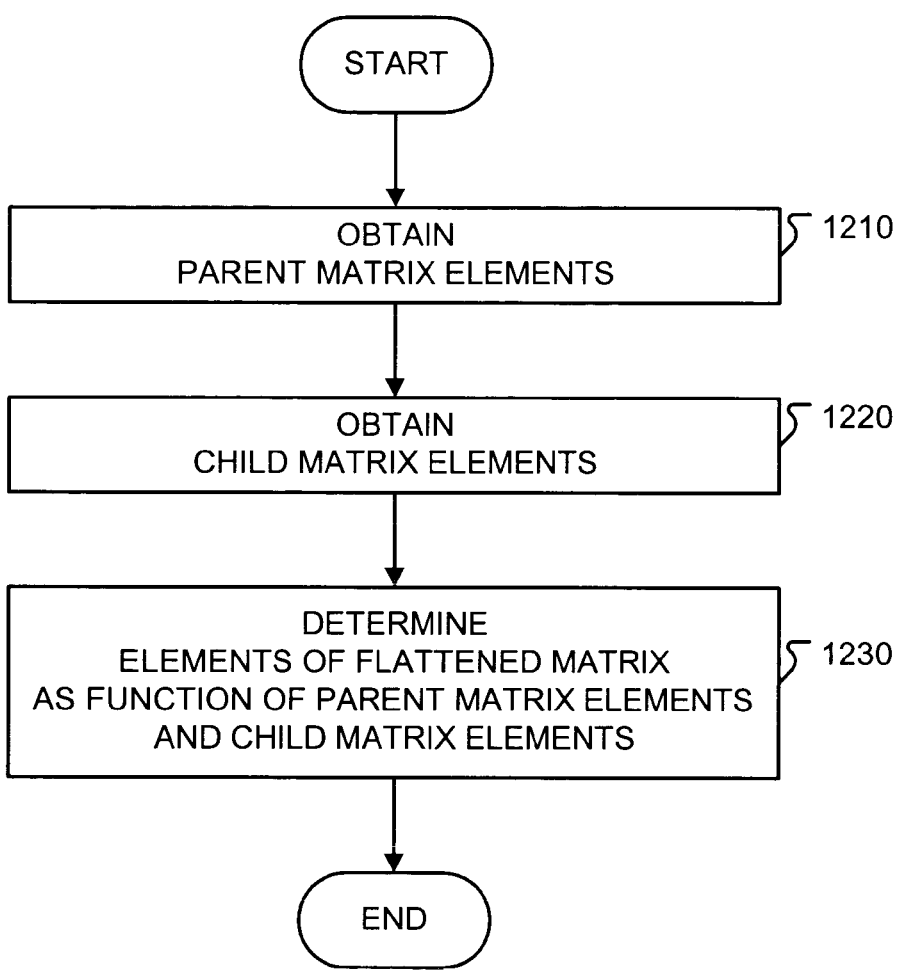
FIG. 12 is a flowchart showing an embodiment of a method for determining elements of a first moment matrix of a flattened model.
Figure 13:
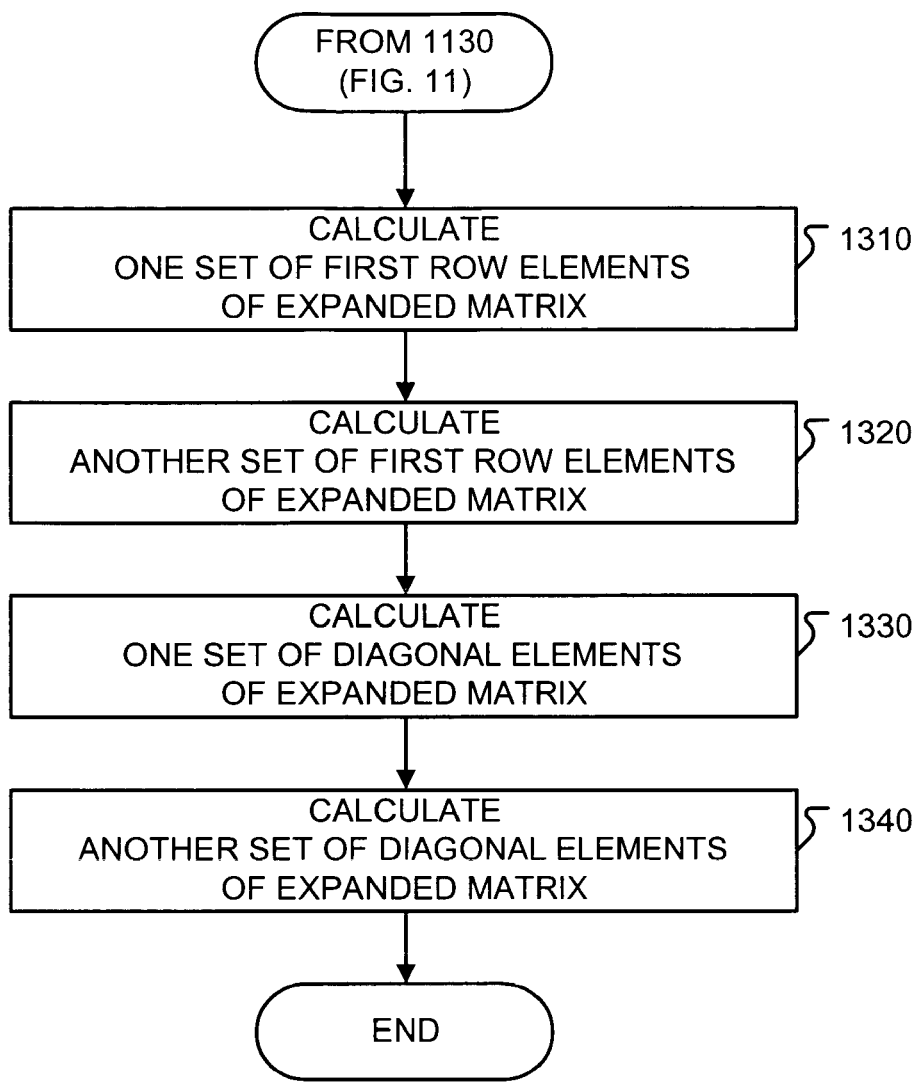
FIG. 13 is a flowchart showing the determining step of FIG. 12 in greater detail.

FIGS. 11 through 13 show embodiments of systems and methods for more efficiently obtaining the first row elements of $N^F$ and the diagonal elements of $N^F$. As shown in FIG. 11, an embodiment of the system may be a computer 1110 that is appropriately configured to perform the calculations of Eqs. 4 through 7. In this regard, FIG. 11 shows an embodiment having logic components that reside in memory 1120 once the computer 1110 has been programmed. As such, the logic components may be seen as comprising parent matrix logic 1130, child matrix logic 1132, a first expanded matrix first-row element logic 1134 (also referred to herein as "first first-row logic"), a second expanded matrix first-row element logic 1136 (also referred to herein as "second first-row logic"), a first expanded matrix diagonal element logic 1138 (also referred to herein as "first diagonal logic"), and a second expanded matrix diagonal element logic 1140 (also referred to herein as "second diagonal logic").

The parent matrix logic 1130 is configured to obtain elements of a parent matrix. The parent matrix is the first moment matrix of a parent process in hierarchical models. For simplicity, the elements of the parent matrix are referred to as parent elements. The parent elements may be obtained using traditional approaches, such as, for example, direct inversion using Eq. 1. If the parent process is nested within a hierarchical model, then the parent elements may also be obtained using Eqs. 4 through 7.

The child matrix logic 1132 is configured to obtain elements of a child matrix. The child matrix is the first moment matrix of a child process in hierarchical models. The child process is nested within the parent process. For simplicity, the elements of the child matrix are referred to as child elements. Similar to the parent elements, the child elements may be obtained using traditional approaches (e.g., direct inversion using Eq. 1), or, if the child process is nested within a hierarchical model, by using Eqs. 4 through 7.

The first first-row logic 1134 is configured to calculate one set of first-row elements of an expanded matrix. The expanded matrix is the first moment matrix of the flattened process in which the child process is instantiated within the parent process. In some embodiments, the set of first-row elements is calculated using:

$$n_{1,j}^F = n_{1,j}^M \quad \text{[Eq. 4]}.$$

The second first-row logic 1136 is configured to calculate another set of first-row elements of the expanded matrix. In some embodiments, the other set of first-row elements is calculated using:

$$n_{1,k}^F = n_{1,S}^M n_{1,k}^S \quad \text{[Eq. 5]}.$$

The first diagonal logic 1138 is configured to calculate one set of diagonal elements of the expanded matrix. In some embodiments, the set of diagonal elements is calculated using:

$$n_{j,j}^F = n_{j,j}^M \quad \text{[Eq. 6]}.$$

The second diagonal logic 1136 is configured to calculate another set of diagonal elements of the expanded matrix. In some embodiments, the other set of diagonal elements is calculated using:

$$n_{k,k}^F = n_{k,k}^S + (n_{S,S}^M - 1) \cdot n_{1,k}^S \quad \text{[Eq. 7]}.$$

As seen from the embodiment of FIG. 11, the computer 1110, once programmed to perform the calculations of Eqs. 4 through 7, provides for a more efficient system for determining elements of the expanded matrix than a system that determines expanded matrix elements by directly inverting the matrix (I–F).

FIG. 12 is a flowchart showing an embodiment of a method for determining elements of a first moment matrix of a flattened model. The flattened model represents an instantiation of a child model within a parent model in a hierarchical model. The first moment matrix of the flattened model is also referred to herein as expanded matrix. As shown in FIG. 12, an embodiment of the method begins when elements of a parent matrix, $N^M$, are obtained (1210). The elements of the parent matrix are also referred to herein as parent elements. The parent matrix is the first moment matrix of the parent model.

In addition to obtaining (1210) the parent elements, elements of a child matrix, $N^S$, are obtained (1220). The elements of the child matrix are also referred to herein as child elements. The child matrix is the first moment matrix of the child model. The parent elements and the child elements may be obtained (1210, 1220) using traditional approaches, such as, for example, direct inversion using Eqs. 1 and 2. The obtaining (1210) of the parent elements results in the obtaining of first-row elements, $n_{1,j}^M$, of the parent matrix and, also, the obtaining of diagonal elements, $n_{j,j}^M$, of the parent matrix. Similarly the obtaining (1220) of the child elements results in the obtaining of the first-row elements, $n_{1,k}^S$, of the child matrix and, also, the obtaining of the diagonal elements, $n_{k,k}^S$, of the child matrix.

Upon obtaining (1210, 1220) both the parent elements and the child elements, elements of an expanded matrix, $N^F$, are determined (1230). The elements of the expanded matrix are determined (1230) as a function of the parent elements and the child elements.

FIG. 13 is a flowchart showing the determining step (1230) of FIG. 12 in greater detail. As shown in FIG. 13, in some embodiments of the determining step (1230), a first set of first-row elements, $n_{1,j}^F$, is calculated (1310) for the expanded matrix. The first set of first-row elements are calculated, in some embodiments, using:

$$n_{1,j}^F = n_{1,j}^M \quad \text{[Eq. 4]}.$$

In this regard, the calculating (1310) of the first set of first-row elements may be performed, in some embodiments, using the first first-row logic 1134 of FIG. 11.

In addition to calculating (1310) the first set of first-row elements, a second set of first-row elements, $n_{1,k}^F$, is calculated (1320) for the expanded matrix. The second set of first-row elements is calculated, in some embodiments, using:

$$n_{1,k}^F = n_{1,S}^M n_{1,k}^S \quad \text{[Eq. 5]}.$$

In this regard, the calculating (1320) of the second set of first-row elements may be performed, in some embodiments, by the second first-row logic 1136 of FIG. 11.

A first set of diagonal elements, $n_{j,j}^F$, is also calculated (1330) for the expanded matrix. The first set of diagonal elements is calculated (1330), in some embodiments, using:

$$n_{j,j}^F = n_{j,j}^M \quad [\text{Eq. 6}].$$

The calculating (1330) of the first set of diagonal elements may be performed, in some embodiments, by the first diagonal logic 1138 of FIG. 11.

A second set of diagonal elements, $n_{k,k}^F$, is also calculated (1340) for the expanded matrix. The second set of diagonal elements is calculated (1340), in some embodiments, using:

$$n_{k,k}^F = n_{k,k}^S + (n_{S,S}^M - 1) \cdot n_{1,k}^S \quad [\text{Eq. 7}].$$

The calculating (1340) of the second set of diagonal elements may be performed, in some embodiments, by the second diagonal logic 1140 of FIG. 11.

As shown in FIGS. 12 through 13, the calculations of Eqs. 4 through 7 provide a more efficient approach to determining elements of the expanded matrix. In this regard, the resources previously used in directly inverting the (I–F) matrix may now be used for other purposes.

The parent matrix logic 1130, the child matrix logic 1132, the first first-row logic 1134, the second first-row logic 1136, the first diagonal logic 1138, and the second diagonal logic 1140 may be implemented in hardware, software, firmware, or a combination thereof. In the preferred embodiment(s), the parent matrix logic 1130, the child matrix logic 1132, the first first-row logic 1134, the second first-row logic 1136, the first diagonal logic 1138, and the second diagonal logic 1140 are implemented in software or firmware that is stored in a memory and that is executed by a suitable instruction execution system. If implemented in hardware, as in an alternative embodiment, the parent matrix logic 1130, the child matrix logic 1132, the first first-row logic 1134, the second first-row logic 1136, the first diagonal logic 1138, and the second diagonal logic 1140 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The software program loaded in memory 1120 of FIG. 11, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the invention as described may be made. For example, while FIG. 11 shows a computer 1110 configured to determine elements of an expanded matrix, it should be appreciated that any programmable device or programmable environment may be configured to determine the elements of the expanded matrix. The programmable environment may be a stand-alone system or, alternatively, the programmable environment may be a distributed network having distributed processes at one or more remote locations. Since distributed networks and distributed computing are known to those having skill in the art, further discussion of distributed computing is omitted here. Also, while specific examples of a GUI environment have been described to more clearly illustrate the various embodiments of the present invention, it should be appreciated that the systems and methods presented herein may be applicable to any approach that employs Markov chain usage models for testing or analysis, such as, for example, software engineering processes, software analysis and testing, system development, business process evaluation, etc. All such changes, modifications, and alterations should therefore be seen as within the scope of the disclosure.

What is claimed is:

1. A system comprising:

means for obtaining a parent matrix, $N^M$, the parent matrix being a first moment matrix of a parent model, the parent matrix having elements, $n_{i,j}^M$, i and j being indices of the parent matrix, the parent matrix having first-row elements, $n_{1,j}^M$, the parent matrix further having diagonal elements $n_{j,j}^M$;

means for obtaining a child matrix, $N^S$, the child matrix being a first moment matrix of a child model, the child model being a submodel within the parent model, the child matrix having elements, $n_{k,l}^S$, k and l being indices of the child matrix, the child matrix having first-row elements, $n_{1,k}^S$, the child matrix further having diagonal elements, $n_{k,k}^S$;

means for determining an expanded matrix, $N^F$, the expanded matrix being a first moment matrix of the child model instantiated within the parent model, the means for determining the expanded matrix comprising:

means for calculating a first set of first-row elements, $n_{1,j}^F$, for the expanded matrix, the first set of first row elements being calculated according to:

$$n_{1,j}^F = n_{1,j}^M;$$

means for calculating a second set of first-row elements, $n_{1,k}^F$, for the expanded matrix, the second set of first row elements being calculated according to:

$$n_{1,k}^F = n_{1,S}^M n_{1,k}^S;$$

means for calculating a first set of diagonal elements, $n_{j,j}^F$, for the expanded matrix, the first set of diagonal elements being calculated according to:

$$n_{j,j}^F = n_{j,j}^M; \text{ and}$$

means for calculating a second set of diagonal elements, $n_{k,k}^F$, for the expanded matrix, the second set of diagonal elements being calculated according to:

$$n_{k,k}^F = n_{k,k}^S + (n_{S,S}^M - 1) \cdot n_{1,k}^S.$$

2. A method comprising the steps of:

obtaining a parent matrix, $N^M$, the parent matrix being a first moment matrix of a parent model, the parent matrix having elements, $n_{i,j}^M$, i and j being indices of the parent matrix, the parent matrix having first-row elements, $n_{1,j}^M$, the parent matrix further having diagonal elements $n_{j,j}^M$;

obtaining a child matrix, $N^S$, the child matrix being a first moment matrix of a child model, the child model being a submodel within the parent model, the child matrix having elements, $n_{k,l}^S$, k and l being indices of the child matrix, the child matrix having first-row elements, $n_{1,k}^S$, the child matrix further having diagonal elements, $n_{k,k}^S$; and determining an expanded matrix, $N^F$, the expanded matrix being a first moment matrix of the child model instantiated within the parent model, the step of determining the expanded matrix comprising the steps of:

calculating a first set of first-row elements, $n_{1,j}^F$, for the expanded matrix, the first set of first row elements being calculated according to:

$$n_{1,j}^F = n_{1,j}^M;$$

calculating a second set of first-row elements, $n_{1,k}^F$, for the expanded matrix, the second set of first row elements being calculated according to:

$$n_{1,k}^F = n_{1,S}^M n_{1,k}^S;$$

calculating a first set of diagonal elements, $n_{j,j}^F$, for the expanded matrix, the first set of diagonal elements being calculated according to:

$$n_{j,j}^F = n_{j,j}^M; \text{ and}$$

calculating a second set of diagonal elements, $n_{k,k}^F$, for the expanded matrix, the second set of diagonal elements being calculated according to:

$$n_{k,k}^F = n_{k,k}^S + (n_{S,S}^M - 1) \cdot n_{1,k}^S.$$

3. In a system having a parent matrix, $N^M$, and a child matrix, $N^S$, the parent matrix being a first moment matrix of a parent model, the parent matrix having elements, $n_{i,j}^M$, i and j being indices of the parent matrix, the parent matrix having first-row elements, $n_{1,j}^M$, the parent matrix further having diagonal elements $n_{j,j}^M$, the child matrix being a first moment matrix of a child model, the child model being a submodel within the parent model, the child matrix having elements, $n_{k,l}^S$, k and l being indices of the child matrix, the child matrix having first-row elements, $n_{1,k}^S$, the child matrix further having diagonal elements, $n_{k,k}^S$, a method comprising the steps of:

calculating a first set of first-row elements, $n_{1,j}^F$, for an expanded matrix, the expanded matrix being a first moment matrix of the child model instantiated within the parent model, the first set of first row elements being calculated according to:

$$n_{1,j}^F = n_{1,j}^M;$$

calculating a second set of first-row elements, $n_{1,k}^F$, for the expanded matrix, the second set of first row elements being calculated according to:

$$n_{1,k}^F = n_{1,S}^M n_{1,k}^S;$$

calculating a first set of diagonal elements, $n_{j,j}^F$, for the expanded matrix, the first set of diagonal elements being calculated according to:

$$n_{j,j}^F = n_{j,j}^M; \text{ and}$$

calculating a second set of diagonal elements, $n_{k,k}^F$, for the expanded matrix, the second set of diagonal elements being calculated according to:

$$n_{k,k}^F = n_{k,k}^S + (n_{S,S}^M - 1) \cdot n_{1,k}^S.$$

4. A method comprising the steps of:

obtaining elements of a parent matrix, $N^M$, the parent matrix being a first moment matrix of a parent model;

obtaining elements of a child matrix, $N^S$, the child matrix being a first moment matrix of a child model, the child model being a submodel within the parent model;

determining elements of an expanded matrix, $N^F$, the expanded matrix being a first moment matrix of a flattened model, the flattened model representing an instantiation of the child model within the parent model, the elements of the expanded matrix being determined as a function of the elements of the parent matrix and the elements of the child matrix.

5. The method of claim 4, wherein the step of obtaining elements of the parent matrix comprises the steps of:

obtaining first-row elements, $n_{1,j}^M$, of the parent matrix; and obtaining diagonal elements, $n_{j,j}^M$, of the parent matrix.

6. The method of claim 5, wherein the step of obtaining elements of the child matrix comprises the steps of:

obtaining first-row elements, $n_{1,k}^S$, of the child matrix; and obtaining diagonal elements, $n_{k,k}^S$, of the child matrix.

7. The method of claim 6, wherein the step of determining elements of the expanded matrix comprises the step of:

calculating a first set of first-row elements, $n_{1,j}^F$, for the expanded matrix, the first set of first row elements being calculated according to:

$$n_{1,j}^F = n_{1,j}^M.$$

8. The method of claim 6, wherein the step of determining elements of the expanded matrix comprises the step of:

calculating a second set of first-row elements, $n_{1,k}^F$, for the expanded matrix, the second set of first row elements being calculated according to:

$$n_{1,k}^F = n_{1,S}^M n_{1,k}^S.$$

9. The method of claim 6, wherein the step of determining elements of the expanded matrix comprises the step of:

calculating a first set of diagonal elements, $n_{j,j}^F$, for the expanded matrix, the first set of diagonal elements being calculated according to:

$$n_{j,j}^F = n_{j,j}^M.$$

10. The method of claim 6, wherein the step of determining elements of the expanded matrix comprises the step of:

calculating a second set of diagonal elements, $n_{k,k}^F$, for the expanded matrix, the second set of diagonal elements being calculated according to:

$$n_{k,k}^F = n_{k,k}^S + (n_{S,S}^M - 1) \cdot n_{1,k}^S.$$

11. In a system having hierarchically-nested processes, a method comprising the steps of:

obtaining a parent matrix, the parent matrix being a first moment matrix of a parent process, the parent matrix having parent elements;

obtaining a child matrix, the child matrix being a first moment matrix of a child process, the child process being nested within the parent process, the child matrix having child elements; and calculating elements of an expanded matrix, the expanded matrix being a first moment matrix of a model, the model representing the child model instantiated within the parent model, the elements of the expanded matrix being calculated as a function of the child elements and the parent elements.

12. A system comprising:

logic configured to obtain a parent matrix, the parent matrix being a first moment matrix of a parent process, the parent matrix having parent elements;

logic configured to obtain a child matrix, the child matrix being a first moment matrix of a child process, the child process being nested within the parent process, the child matrix having child elements; and logic configured to calculate elements of an expanded matrix, the expanded matrix being a first moment matrix of a model, the model representing the child model instantiated within the parent model, the elements of the expanded matrix being calculated as a function of the child elements and the parent elements.

13. In a system having a parent matrix, $N^M$, and a child matrix, $N^S$, the parent matrix being a first moment matrix of a parent model, the parent matrix having elements, $n_{i,j}^M$, i and j being indices of the parent matrix, the parent matrix having first-row elements, $n_{1,j}^M$, the parent matrix further having diagonal elements n, the child matrix being a first moment matrix of a child model, the child model being a submodel within the parent model, the child matrix having elements, $n_{k,l}^S$, k and l being indices of the child matrix, the child matrix having first-row elements, $n_{1,k}^S$, the child matrix further having diagonal elements, $n_{k,k}^S$, a system comprising:

logic configured to calculate a first set of first-row elements, $n_{1,j}^F$, for an expanded matrix, the expanded matrix being a first moment matrix of the child model instantiated within the parent model, the first set of first row elements being calculated according to:

$$n_{1,j}^F = n_{1,j}^M;$$

logic configured to calculate a second set of first-row elements, $n_{1,k}^F$, for the expanded matrix, the second set of first row elements being calculated according to:

$$n_{1,k}^F = n_{1,S}^M n_{1,k}^S;$$

logic configured to calculate a first set of diagonal elements, $n_{j,j}^F$, for the expanded matrix, the first set of diagonal elements being calculated according to:

$$n_{j,j}^F = n_{j,j}^M; \text{ and}$$

logic configured to calculate a second set of diagonal elements, $n_{k,k}^F$, for the expanded matrix, the second set of diagonal elements being calculated according to:

$$n_{k,k}^F = n_{k,k}^S + (n_{S,S}^M - 1) \cdot n_{1,k}^S.$$

14. A computer-readable medium comprising:

computer-readable code adapted to instruct a programmable device to obtain elements of a parent matrix, $N_M$, the parent matrix being a first moment matrix of a parent model;

computer-readable code adapted to instruct a programmable device to obtain elements of a child matrix, $N^S$, the child matrix being a first moment matrix of a child model, the child model being a submodel within the parent model;

computer-readable code adapted to instruct a programmable device to determine elements of an expanded matrix, $N^F$, the expanded matrix being a first moment matrix of a flattened model, the flattened model representing an instantiation of the child model within the parent model, the elements of the expanded matrix being determined as a function of the elements of the parent matrix and the elements of the child matrix.

15. The computer-readable medium of claim 14, further comprising:

computer-readable code adapted to instruct a programmable device to obtain first-row elements, $n_{1,j}^M$, of the parent matrix; and computer-readable code adapted to instruct a programmable device to obtain diagonal elements, $n_{j,j}^M$, of the parent matrix.

16. The computer-readable medium of claim 15, further comprising:

computer-readable code adapted to instruct a programmable device to obtain first-row elements, $n_{1,k}^S$, of the child matrix; and computer-readable code adapted to instruct a programmable device to obtain diagonal elements, $n_{k,k}^S$, of the child matrix.

17. The computer-readable medium of claim 16, further comprising:

computer-readable code adapted to instruct a programmable device to calculate a first set of first-row elements, $n_{1,j}^F$, for the expanded matrix, the first set of first row elements being calculated according to:

$$n_{1,j}^F = n_{1,j}^M.$$

18. The computer-readable medium of claim 16, further comprising:

computer-readable code adapted to instruct a programmable device to calculate a second set of first-row elements, $n_{1,k}^F$, for the expanded matrix, the second set of first row elements being calculated according to:

$$n_{1,k}^F = n_{1,S}^M n_{1,k}^S.$$

19. The computer-readable medium of claim 16, further comprising:

computer-readable code adapted to instruct a programmable device to calculate a first set of diagonal elements, $n_{j,j}^F$, for the expanded matrix, the first set of diagonal elements being calculated according to:

$$n_{j,j}^F = n_{j,j}^M.$$

20. The computer-readable medium of claim 16, further comprising:

computer-readable code adapted to instruct a programmable device to calculate a second set of diagonal elements, $n_{k,k}^F$, for the expanded matrix, the second set of diagonal elements being calculated according to:

$$n_{k,k}^F = n_{k,k}^S + (n_{S,S}^M - 1) \cdot n_{1,k}^S.$$

* * * * *